US006850249B1

(12) United States Patent
Gu

(10) Patent No.: US 6,850,249 B1
(45) Date of Patent: *Feb. 1, 2005

(54) AUTOMATIC REGION OF INTEREST TRACKING FOR A COLOR CORRECTION SYSTEM

(75) Inventor: Xueming Henry Gu, Ft. Lauderdale, FL (US)

(73) Assignee: Da Vinci Systems, Inc., Coral Springs, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,913

(22) Filed: Mar. 31, 1999

Related U.S. Application Data

(60) Provisional application No. 60/080,635, filed on Apr. 3, 1998.

(51) Int. Cl.[7] ................................................. G09G 5/00
(52) U.S. Cl. ....................... 345/623; 345/625; 345/619; 345/589
(58) Field of Search ................................ 382/282, 199, 382/164, 167, 197, 293, 295; 358/453, 452; 707/520–521; 345/342, 582, 428, 581, 589, 593, 619, 622, 623, 621, 620, 626, 625; 348/564, 565–566

(56) References Cited

U.S. PATENT DOCUMENTS

| 4,394,680 | A | * | 7/1983 | Watanabe ..................... 358/22 |
| 4,525,736 | A | * | 6/1985 | Korman ........................ 358/28 |
| 4,533,938 | A | * | 8/1985 | Hurst ........................... 358/27 |
| 4,710,800 | A |   | 12/1987 | Fearing et al. ................. 358/22 |
| 4,763,280 | A | * | 8/1988 | Robinson et al. ........... 364/518 |

(List continued on next page.)

FOREIGN PATENT DOCUMENTS

| EP | 0 323 168 A | 7/1989 |
| EP | 0 829 821 A | 3/1998 |

OTHER PUBLICATIONS

Matsuyama et al., Multiply Descent Cost Competitive Learning as an Aid for Multimedia Image Processing, Proceeding of 1993 International Joint Conference on Neural Networks, Oct. 28, 1993.

Understanding Color Maps, Picture Publisher 5.0 User's Guide, Web Edition, 1996 by Micrografx, Inc.

Adobe Photoshop User Guide (Version 4.0, pp. 146–151).

The Renaissance 8:8:8 User's Guide (Version 1.7, Sep. 1, 1996), Chapter 5.

The DaVinci Renaissance 8:8:8 User's Guide (Version 1.7, Sep. 1, 1996), Chapter 6.

*Primary Examiner*—Kent Chang
(74) *Attorney, Agent, or Firm*—Morris, Manning & Martin LLP

(57) ABSTRACT

A system and methods for creating user definable windows for applying image processing, particularly useful in a post-production color correction equipment. The system allows a user of an image processing system such as a scene by scene color corrector to define a color region of interest in an image for purposes of applying image processing only to the region of interest, with automatic tracking of that region of interest over a plurality of frames in a scene. The user defined window, comprising a closed polygon, is converted on a frame-by-frame basis to a matte that is keyed with image processing such as color correction values. The user defined windows can be edited and stored and recalled for use in other frames. The color region of interest is automatically tracked from a beginning frame to the ending frame of a scene, with a vector window defined for each frame, so as to adapt to and compensate for changes in shape, size, and geometry of the region of interest during the succession of frames in the scene.

77 Claims, 17 Drawing Sheets

U.S. PATENT DOCUMENTS

| | | | |
|---|---|---|---|
| 4,782,384 A | * 11/1988 | Tucker et al. | 358/22 |
| 4,908,874 A | 3/1990 | Gabriel | 382/41 |
| 4,952,051 A | 8/1990 | Lovell et al. | 352/87 |
| 4,954,881 A | 9/1990 | Kaye | 358/22 |
| 5,050,984 A | 9/1991 | Geshwind | 352/38 |
| 5,051,928 A | 9/1991 | Gruters | 364/521 |
| 5,130,935 A | 7/1992 | Takiguchi | |
| 5,252,953 A | 10/1993 | Sandrew et al. | 345/122 |
| 5,327,501 A | 7/1994 | Kato et al. | 382/44 |
| 5,450,500 A | 9/1995 | Brett | 382/162 |
| 5,495,540 A | 2/1996 | Frankot et al. | 382/294 |
| 5,506,946 A | 4/1996 | Bar et al. | 395/131 |
| 5,506,949 A | 4/1996 | Perrin | 395/152 |
| 5,530,774 A | 6/1996 | Fogel | 382/154 |
| 5,850,471 A | 12/1998 | Brett | 382/162 |
| 5,874,988 A | 2/1999 | Gu | 348/97 |
| 6,097,853 A | * 8/2000 | Gu et al. | 382/282 |

* cited by examiner

WORKSTATION MONITOR
ORIGINAL CAPTURED COLOR IMAGE

SELECT POINT(S) TO DETERMINE MEAN COLOR

ADJUST POINTS OF VECTORIZED REGION; ADJUST MEAN & VARIANCE; ADD REGION

DETECT COLOR REGION OF INTEREST VECTORIZED

VECTORIZED KEY WINDOW(S)

CONVERT VECTORIZED KEY WINDOW TO MATTE FOR APPLYING PROCESSING

COLOR REGION OF INTEREST

COLOR GRABBER ROUTINE

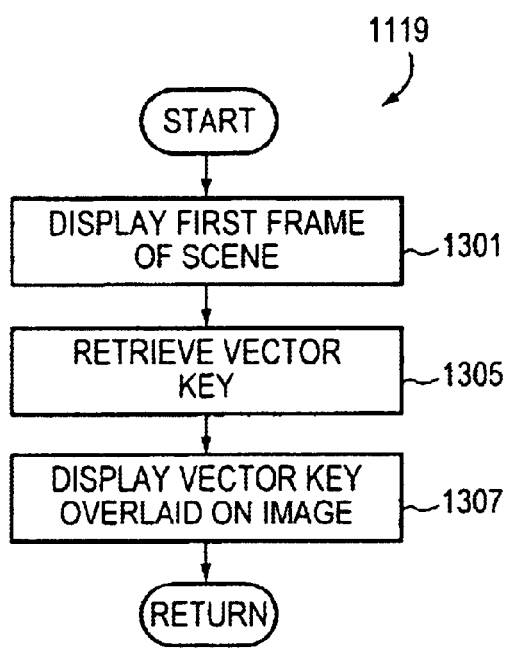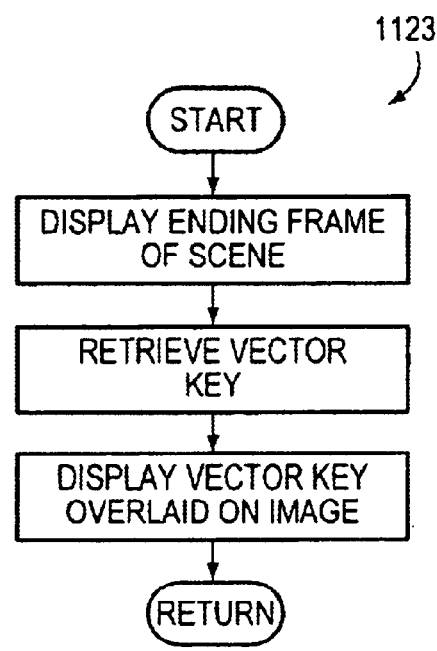
FIRST FRAME ROUTINE
FIG. 13
ENDING FRAME ROUTINE
FIG. 14

VARIANCE ROUTINE

ADD REGION ROUTINE

DETECT ROUTINE

AUTOMATIC REGION OF INTEREST TRACKING FOR A COLOR CORRECTION SYSTEM

CROSS REFERENCE TO RELATED APPLICATIONS

The following U.S. Patent Application claims priority under 35 U.S.C. §119 to the U.S. Provisional Application No. 60/080,635 filed on Apr. 3, 1998.

TECHNICAL FIELD

The present invention relates generally to image processing, and more particularly relates to systems and methods that allow a user of an image processing system such as a scene by scene color corrector to define a color region of interest in an image for purposes of applying image processing only to the region of interest, with automatic tracking of that region of interest over a plurality of frames in a scene.

BACKGROUND OF THE INVENTION

In certain types of image processing systems, especially color correction systems employed in post-production equipment, system operators observe an image on a video monitor, adjust color and other parameters of the image until it is aesthetically satisfactory, store the parameters in system memory, and apply the parameter corrections to a sequence of images forming a scene. Various types of image processing are often employed to create, enhance, compress, filter, or otherwise modify characteristics of an image. In a video signal color correction system, color corrections of motion picture film and/or video tape are typically made on a scene-by-scene basis. A "scene" is a sequential collection of images shot from the same camera, having the same viewpoint, composed in a certain way, etc. A system operator or "colorist" views a selected exemplary image or frame from a scene. The colorist then applies color corrections via a control panel to adjust video parameters such as hue, saturation, luminance, etc. of a frame image being viewed. The correction settings are stored in system memory.

After the colorist is satisfied with the adjustments he or she has made to the selected frame, the correction system, which is typically computer-controlled, applies the stored color corrections to each frame in the scene one at a time. The color-corrected frames of the scene are then recorded on film or videotape. The steps are repeated for other scenes in the film or video tape, often with different correction settings stored for different scenes. This process creates a color-corrected master film or video tape that reflects color adjustments to all frames in all scenes.

Devices are known in the art for defining a region of an image for applying one set of color corrections, with other regions of the image receiving another, separate set of color corrections. Such devices are useful when it is desired to isolate a certain area of an image to receive special image processing. For example, in color correcting a soft drink commercial it may be desirable to isolate the beverage can from the remainder of the image so as to make the colors of the beverage can stand out from the rest of the image.

Certain prior art image processing computer software, e.g. ADOBE PHOTOSHOP™, manufactured by Adobe Systems Corporation, Mountain View, Calif., employs edge detection algorithms for detecting color regions and creating paths or Bezier curves between points. Such edge detection algorithms rely upon color differences between regions to define the paths and produce odd results if there are discontinuities in the edges of a region, or if the colors defining the regions are not sufficiently dissimilar. The PHOTOSHOP™ software, for example, vectorizes an entire color region and provides no control over the number of points in the region. There is no way to modify a defined region except by changing region qualification parameters. For these and other reasons, such software is not suitable for real time applications such as a scene by scene color corrector.

A system for creating user definable windows for applying image processing is described in U.S. patent application Ser. No. 08/912,662, filed Aug. 8, 1997 entitled "User Definable Windows for Selecting Image Processing Regions." This application is owned by the same assignee as the present invention. In this system, the luminance values of a key image are captured in a key frame buffer. The key image is edited in a "paint" mode to enhance the luminance values or eliminate regions of the image, to define a region of interest. The key image is then converted to a 1-bit image. The 1-bit image is vectorized to derive a user defined window. The user defined window, comprising a closed polygon, is converted on a frame-by-frame basis to a matte that is keyed with image processing such as color correction values. User defined windows can be edited and stored and recalled for use in other frames. A user defined window for a first frame of a scene can be transformed or morphed into a user defined window for a final frame of a scene, with the system automatically interpolating between the beginning window and the ending window so that the window is automatically moved, resized, and changed in geometry during the succession of frames in a scene.

Although this system provides remarkable improvements in isolating regions for receiving color correction in a scene-by-scene color corrector, only the luminance of the target image is employed to isolate a region of interest. Moreover, the system as described in this patent is not capable of automatically tracking a region of interest based on its color parameters (hue, saturation, and/or luminance) over a number of frames-the system therein described "morphs" the polygon from a first frame to a final frame of a scene.

There is a need, however, for a system that isolates a region of interest by its color parameters, e.g. hue, saturation, and/or luminance, or red/green/blue values, and employs those color parameters to establish and track the region of interest over number of frames in a scene, to effect automatic tracking of the region of interest over a plurality of frames.

SUMMARY OF THE INVENTION

The present invention is particularly adapted for use in connection with the system described in U.S. patent application Ser. No. 08/912,662, filed Aug. 8, 1997, entitled "User Definable Windows for Selecting Image Processing Regions," the disclosure of which is incorporated herein by reference and made a part hereof.

The system in this patent employs the concept of a key well known in the television arts to define regions for receiving image processing. A good example of the use of a key is that of a television weatherman superimposed on a map. The weatherman is typically shot with a video camera standing in front of a solid blue color background. Other equipment automatically generates the video weather map. Image processing equipment is readily able to discern the outline of the weatherman relative to the blue background by use of color values. The image of the weatherman, which is called a "key", is overlaid on the map by essentially providing transparency for the blue regions of the key outside the weatherman's body. This allows the weather map to show through in the blue areas, and superimposes the weatherman on top of the map.

Related principles are employed in the present invention for defining a user defined key corresponding with a predetermined region of an image and utilizing the key to derive a user defined window. Image processing such as a set of color corrections is applied within the region defined by the key-derived user defined window. A separate second type of image processing, for example a second set of color corrections, is applied in regions outside the user defined window.

Briefly described, the present invention comprises a system and methods that allow creation of user definable windows for selecting image processing regions. These windows can vary in geometry, size, and location during a number of frames in a scene. The invention is particularly useful for allowing a colorist in a video image color correction system to define windows for selecting regions for color correction. The user typically starts by capturing an exemplary image or frame of a scene for use as a "key image" or "key frame". The key image is manipulated by adjusting parameters such as gain, clip, and limit to derive one or more key regions of the image to serve as keys. The key regions are vectorized and stored in a computer system's memory in association with the key frame. The vectorized keys, which are then called "user defined windows", are then used during a plurality of frames for defining regions to receive image processing such as color correction, data compression, noise reduction, etc.

For use in a scene having a number of frames, the user defines a window for a first frame of the scene and a window for the last frame of the scene. The user may use the last frame as a key image and derive another key for defining the final window, can use and modify the window for the first frame for defining the final window, or can use modify any other previously defined window.

The system described in the referenced patent then interpolates or "morphs" the window of the first frame of the scene into the window of the final frame of the scene by linear interpolation across each frame of the scene. The windows are generated on a real time, frame by frame basis so that the color correction or other image processing can be viewed by the colorist on a video monitor. The windows thus change during the sequences of frames in the scene to compensate for changes in the size, geometry, and position of the area of interest in the scene.

In a system constructed in accordance with the present invention, the operator uses a pointer to select a point or group of points (a region) having desired color properties. The system automatically calculates the mean of the red, green, and blue values of each pixel of the selected point or points. The system then searches for other points having red, green, and blue values within a predetermined variance. The system then defines a boundary that separates qualified points from the rest, and vectorizes this boundary to obtain a closed polygon. This polygon defines a user defined window as in the incorporated patent.

The operator has the capability to adjust the initial mean value and the variance for each of the red, green, and blue channels. This allows inclusion of more or fewer points from the collection of qualifying points, and a new polygon or user-defined window can be defined.

In operation, the operator selects at least one region of a starting image frame. The operator also selects an ending image frame. The system can then be commanded to search for similarly colored regions in the intervening frames and create user-defined windows for each intervening frame by applying the selection criteria (for example, within a predetermined variance of the mean red, green, and blue). This allows creation of a new, different user defined window for each frame of the scene, automatically, which tracks the selected color region of interest regardless of geometric shape or location in the image.

According to another aspect of the invention, the operator can define plural regions of interest in each frame, with each region having different selection criteria. The regions need not have the same characteristics, such as color or shape.

After the regions of interest are isolated and vectorized to obtain user defined windows, the characteristics of the user defined windows can be edited to allow the user to adapt the window to the outline of the region of interest. Modification of a user defined window comprises adjusting the number of points representing a window, and adjusting the location of one or more selected points of a window.

Advantageously for use in a real time processing environment such as a scene-by-scene color corrector, the operation of automatically tracking the color region of interest from during playback of the scene is carried out at a real time rate. Thus, the user can adjust aspects of the image processing for exemplary frames of a scene and observe the effects of the image processing during playback of the scene on a real time basis.

These and other features and advantages of the present invention may be more clearly understood and appreciated from a review of the following detailed description of the disclosed embodiment and by reference to the appended drawings and claims.

BRIEF DESCRIPTION OF THE DRAWINGS

FIG. 13 is a flow diagram of a first frame computer-implemented process.

FIG. 14 is a flow diagram of an ending frame computer-implemented process.

DETAILED DESCRIPTION OF THE DISCLOSED EMBODIMENT

Figure 1:
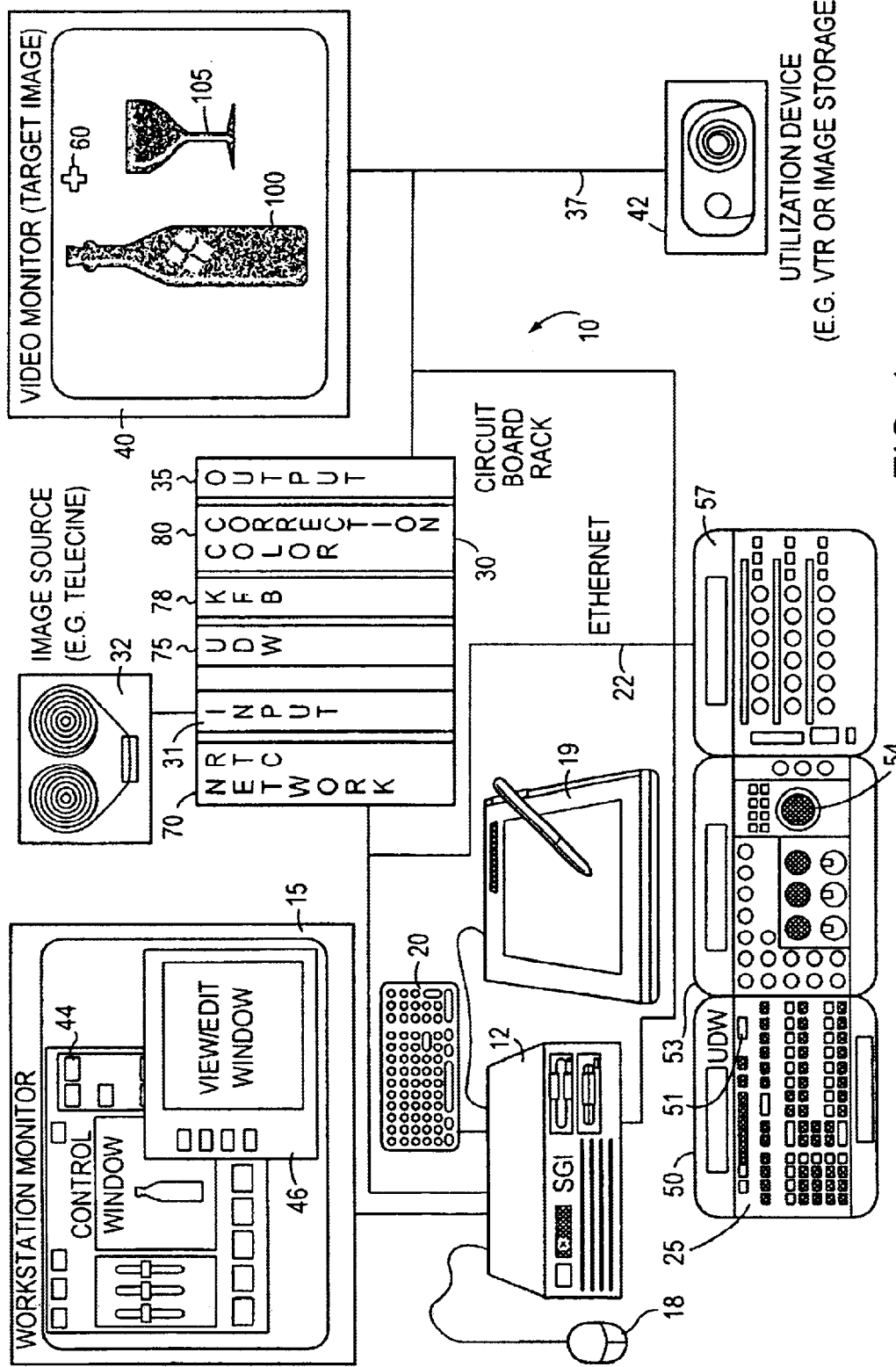
FIG. 1 is a block schematic diagram of a system for creating user definable windows for applying image processing, constructed in accordance with the preferred embodiment of the present invention, shown in connection with a scene by scene color correction system.

Referring now to the drawings, in which like numerals indicate like elements or steps throughout the several figures, FIG. 1 illustrates an image processing system 10 constructed in accordance with the preferred embodiment of the present invention, suitable for carrying out the claimed methods for defining windows for applying image processing and autotracking of color regions of interest.

Preferred Embodiment of Color Correction System

Although the present invention will be described in the context of a scene by scene digital color corrector, it will be understood that the inventions described herein are not limited to video color correction and are equally useful in other types of systems where there is a need for application of image processing such as image compression, image filtering, noise suppression, animation, and any other type of processing. In particular, the invention is useful in any image application where there is a need to define a region of an image for receiving one type of data processing and another region for receiving a different type of data processing. However, in the context of the disclosed embodiment, the inventions are particularly useful in a scene by scene color corrector where a plurality of frames comprising a scene must be viewed and adjusted to create or modify a video program such as a movie, commercial, television program, etc.

As used herein, the term "key" is used to describe a predetermined region of an image that is used to define or derive a user defined window which is stored in a vector format, as well as the video matte produced by devectorizing a user defined window which is employed to selectively apply image processing to image regions in accordance with the matte.

In FIG. 1, an image processing system 10 constructed in accordance with the preferred embodiment comprises several basic components—a computer-based workstation 12 including monitor 15 and keyboard 20, a colorist's control panel 25, a digital color correction system 30, a source of images 32, a video display 40, and a destination for corrected images 42. The workstation 12 preferably includes pointing devices such as a mouse 18 and/or graphics tablet 19. The workstation 12 is coupled for data communications via a network connection 22, preferably a high speed network such as Ethernet, to the color correction system control panel 25 and color correction system 30.

The source of images 32 may be a telecine, video tape player, or a digital video storage medium. The source is connected to an Input circuit board 31 in the color correction system 30. It will be understood that the image signals internal to the color correction system 30 are digital, and are stored and manipulated in a digital video format such as the International Radio Consultant Committee (CCIR) promulgated Recommendation No. 601-1 which defines a standard set of digitized color signals. CCIR Recommendation 601-1 (1986) is hereby incorporated by reference. It is known in the art to take CCIR 601-1 digitized signal streams, convert same to corresponding RGB signals (in analog or digital domains), and then to perform the primary and secondary color corrections and modifications on the resultant signals. The corrected or modified signal can then be passed through a signal matrix and reconverted to a digital bit stream through use of an analog to digital converter. The standard signals defined in Recommendation 601-1 essentially consist of a luminance signal Y and two color difference signals (R-Y) and (B-Y). It is well known that, since the luminance signal contains information on levels of red, green and blue (RGB), the three standard signals can be used to reproduce the RGB levels for any given set of samples.

An Output circuit board 35 is also provided as a part of the color correction system 30, and typically converts the digital signals within the color correction system back into analog form for display. Thus, the Output circuit 35 is coupled via a video signal cables 37 to a video monitor 40, to a utilization device 42 such as a video tape player or other image storage device, and to the workstation 12 so that the results of image processing (e.g. color correction) can be viewed by the operator on the workstation monitor. It will also be understood that the corrected digital signals can be stored in digital form in a digital data storage device coupled to the system.

The preferred workstation 12 is an INDY™ model workstation manufactured by Silicon Graphics, Inc. (SGI). The preferred workstation includes an R4600 RISC processor operating in excess of 133 MHz, internal 24-bit XL color graphics (with RGB single or double buffer color indexes), a digital video input port capable of storing 640×480×30 fps to memory, 2 serial and 1 parallel data port, an Ethernet network port, a fast SCSI-2 data port, at least 32 megabytes of RAM, and a 1.0 or larger Gb hard disk. Optionally, a different SGI model workstation could be employed, e.g. one including a video adapter card that allows support and use of multiple monitors. Further details of the preferred workstation are available in the literature supplied by the manufacturer.

The preferred workstation 12 includes on-board display driver circuit, namely, the 24-bit XL color graphics circuitry with RGB double buffer color indexes, which provides video signals to at least one workstation monitor 15. A separate, second video monitor 40 is utilized in the preferred embodiment to display a target image, that is, a full screen representation of the video image being processed in the system. If a workstation model is employed that supports multiple monitors, the second monitor 40 may be connected to the workstation 12.

The preferred graphics tablet 19, which is particularly useful for certain manipulations of key images and vectors as will be described, is a Wacom ArtPad™ or ArtZ™ graphics tablet manufactured by Wacom Technology Corporation, Vancouver, Wash. 98661.

The preferred color correction system 30 is a Da Vinci RENAISSANCE 8:8:8™ digital color corrector manufactured by Da Vinci Systems, Inc., Ft. Lauderdale, Fla. This color correction system includes various circuit board components that are employed to carry out digital video signal processing, and is coupled to the control panel 25. The preferred RENAISSANCE 8:8:8™ control panel 25 comprises three separate panels each having a combination of dedicated keys, soft keys, and soft knobs that provides many simultaneous functions utilized in the color correction process. A dedicated keyboard 50 contains both dedicated and soft keys for system feature control, display/list management, source and destination motion control, editing, special effects' features, and the like. This keyboard also contains a slide-out alphanumeric keyboard (not shown) to enter names, comments, and other important session information. Included on this control panel is a "User Definable Windows" (UDW) button or key 51 that is utilized to activate the functions described herein.

It will be understood that the preferred RENAISSANCE 8:8:8™ system includes software that is operative for controlling the image source and destination, and reading and storing frame numbers in association with user-defined scene identifiers or names. Thus, the system is able to provide displays of scene lists that facilitate the user in associating scene identifiers or names with exemplary images from the scene.

The control panel 25 further includes a joyball panel 53, which includes knobs, a trackball 54 for manipulating a cursor, keys for source setup, primary color balance, color grabbing, trackball control, and other effects control. When the windows feature of the present invention is activated, movement of the trackball 54 causes generation of a cursor 60 that is displayed on the video monitor 40. The cursor 60 is utilized to manipulate and select portions of video images displayed on the monitor, as will be described.

Finally, the control panel 25 includes a soft panel 57, which contains knobs and softkeys for dedicated 6-color secondary enhancement, special effects control, dedicated memory keys, and other functions not forming a part of the present invention. It will be understood that the provision of primary and secondary color correction, and sets of primary and secondary color correction, one for regions inside a user defined window and one for regions outside a user defined window, can be set and stored in memory by manipulation of controls on the soft panel 57.

The color correction system 30 includes several circuit boards that provide the functions required to carry out color correction or other types of image processing in the digital domain, and to control input from the image source 32 and utilization or storage in the utilization device 42. These circuits include a real time controller (RTC) circuit 70 with network interface that provides a data communication network interface to the data communication network 22 coupling the color correction system 30 to the workstation 12 and color correction system control panel 25.

The real time controller (RTC) 70 includes a dedicated microprocessor for handling real time events. Real time events occur at the rate of one every 30 millisecond (ms), so as to maintain an event rate corresponding to at least a 33 frames per second (fps) display rate. Data comprising an events list is provided to the RTC 70 via the data communications network 22; this events list is provided to control various functions of components in the system, for example providing a set of color corrections for each frame of a specified scene being processed. In particular, the events list as employed in the present invention includes a data structure that identifies a particular frame number and scene number, information that specifies one or more user defined windows for the particular frame, information identifying color corrections to be applied to areas inside the one or more windows of the particular frame, and information identifying color corrections to be applied outside the window of the particular frame, and other information.

The events list in the preferred embodiment is a data structure having frame numbers as a time reference. The data structure comprises a sequence of data blocks, each block being related to a beginning frame number and an ending frame number. Each block is called a "scene" which corresponds to a continuous segment of film or video shots. Each block also contains a set of color correction parameters and window parameters. The color correction parameters include known parameters such as red gain, red gamma, red black, etc., for each RGB color channel. The window parameters include window shape, window size, window location, and other information.

A user definable windows (UDW) generator board 75 constructed as described herein includes a dedicated high speed microprocessor that converts vectorized user defined windows into a video matte or key on a real time basis at the real time event rate. The RTC circuit 70 provides the vector representations of the windows to the UDW board 75 at the real time event rate.

A key frame buffer (KFB) circuit board 78 stores a video image from the image source 32, or from any other digital storage system, in a high speed memory. This image is then utilized in accordance with methods described herein to derive a vector representation of any user defined windows. Keys for vectorizing may be obtained directly from the image source 32 or be retrieved from prestored images stored in the memory of the workstation 12.

Color correction circuit 80 carries out digital color correction and other video parameter adjustment functions associated with the color correction system 30. The block in FIG. 1 identified as the color correction circuit 80 includes all of the remaining functions of the preferred RENAISSANCE 8:8:8™ digital color correction system 30, and will not be discussed further. Details of the operations and functions of the preferred color correction system 30 are available in the literature supplied by the manufacturer.

As will be understood by those skilled in the art, the preferred color correction system 30 is operative to receive video images from an image source such as telecine 32, digitize the video images, capture a digitized image in the KFB board 78, display the captured image on the video monitor 40, receive color corrections entered by the colorist or operator via the control panel 25, impose such color corrections upon video images as they are transferred through the system, and provided corrected output signals via the output board 35 which are employed or stored in a utilization device 42 and/or simultaneously displayed on the video monitor 40.

In carrying out the operations for applying image processing to user defined windows, a system operator or user interacts with the system through the control panel 25, and via the user interface elements of the workstation 12, namely, keyboard 20, mouse 18, graphics tablet 19, and workstation monitor 15. In particular, the workstation 12 executes computer programs for carrying out the computer-implemented methods described herein, and generates displays on the monitor 15 containing windows with user interface elements such as informational displays, control buttons, slider bars, data entry fields, image display areas, etc.

The reader should be careful here to distinguish user-interface "windows" displayed on the monitor 15 generated from execution of computer software for carrying out the invention, from the "user defined windows" for applying image processing. During. system use, the workstation monitor 15 will typically be displaying one or more user-interface oriented windows for carrying out the methods as described herein. One such user-interface window is a control window 44, which comprises a display of various buttons and slider controls for manipulation of the key image. Activation of certain commands causes the display of other, secondary windows.

One of the secondary windows is a View/Edit Window 46, shown overlapping the control window 44 in FIG. 1. The View/Edit Window 46 is used to display a captured image in greater detail, and to provide certain additional user controls specifically associated with editing of the image, identifying regions of interest, etc.

The system operator manipulates controls in the Control Window 44 (of which there are several types), and interacts with the images, vector windows or keys, etc. through various View/Edit windows 46 of different types.

It should be noted that the video images displayed in the video monitor 40 are preferably displayed within a particular View/Edit window 46. Since the images provided from the image source are digitized for processing in the preferred RENAISSANCE 8:8:8™ processing system, the system readily generates digitized video images and provides them in an appropriate format, such as Apple Computer's Quicktime™ video format, MPEG I or II, or other digital video format via the network 22 to the workstation 12. Accordingly, it will be appreciated that any displays described herein where a video image is shown on the video monitor 40 are typically also displayed (albeit in reduced size) on the workstation monitor 15. Furthermore, any of the functions described in conjunction with a video monitor including generation of a cursor of a display of overlays of user defined window over a video image, display of a key, etc. can also be supplied in a window in the workstation display 15.

Thus, it is to be expected that as more and more image processing of film and video is conducted in the digital domain, as opposed to the traditional analog domain, methods of the present invention will be utilized in strictly digital systems for image storage, retrieval, manipulation, display, and output.

In the disclosed embodiment, however, the results of image processing are viewed on the video monitor 40, while the user interface and controls aspects of the image processing and the invention are carried out through the workstation 12 and its associated monitor 15.

Overview of Method for Color Region of Interest

As partly described in the referenced patent, the system operates in a plurality of different primary modes. One is a keystore mode that allows capture, editing and manipulation of 10-bit and 1-bit key images based on luminance capture, another is a vector editing mode that allows manipulation of user-defined vectorized windows dry from key images in the key store mode, and another is a color region of interest (ROI) mode that allows definition of regions by color information and manipulation of the vectorized regions of interest.

Figure 2:
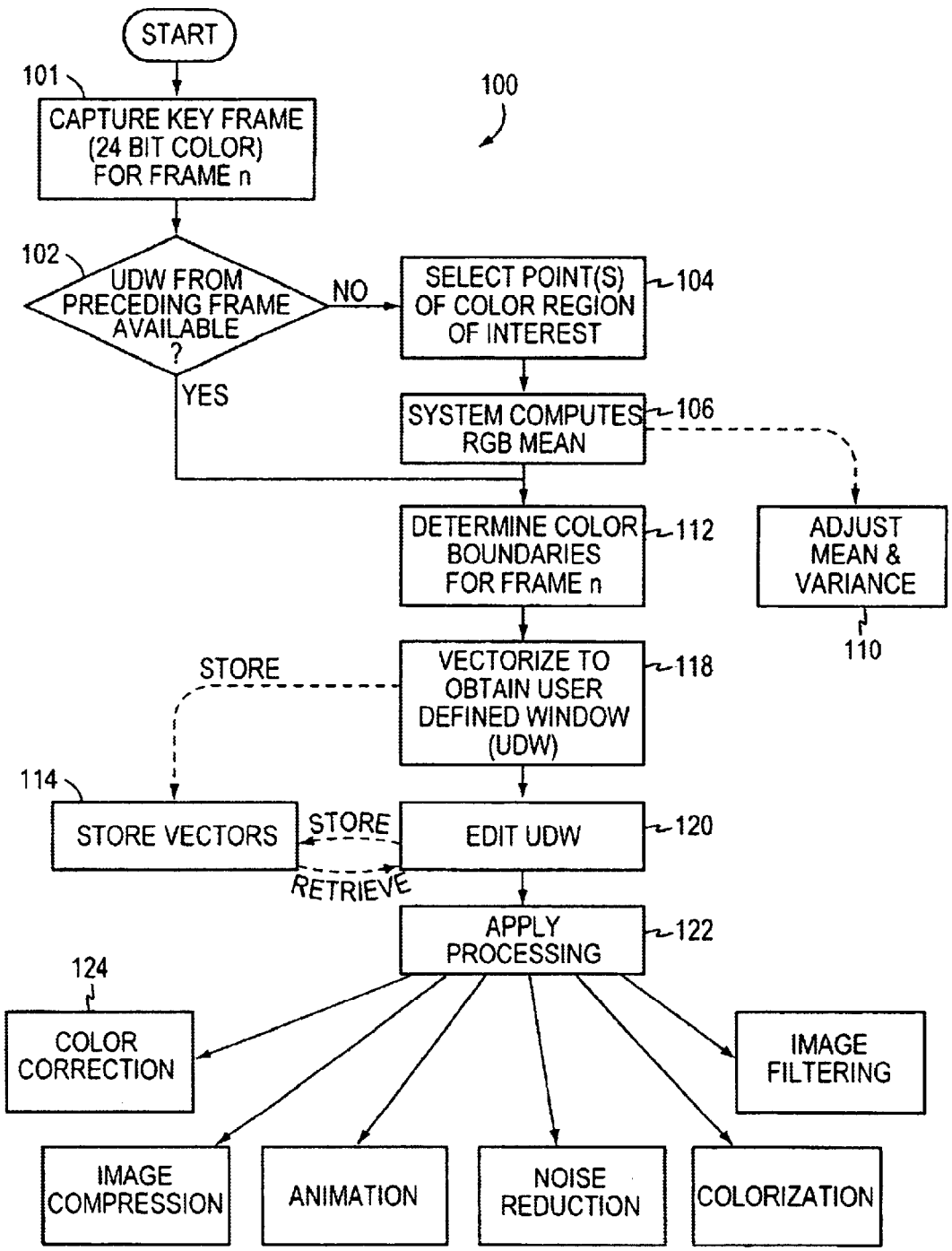
FIG. 2 is a flow chart illustrating the general process of capturing a key frame, selecting a color region of interest, deriving a user defined window, and applying image processing in accordance with the user defined window.

Turn next to FIG. 2 for an overview of the general process 100 of capturing a color keyframe, selecting a color region of interest, editing the key frame to derive a key, deriving a user-defined window from the key, causing the color region of interest to autotrack the selected region of interest over a plurality of frames in a scene, and apply image processing in accordance with the user defined window. It will be understood that the method described in FIG. 2 is supplementary and parallel to that described in connection with the referenced patent.

It should be understood that in the following several discussions of methods and processes involved in the present invention, numerous details are provided such as computer display system elements, aspects of computer program user interfaces, display screens and formats, sample data, etc. in order to provide an understanding of the invention. However, those skilled in the art will understand that the present invention may be practiced without the specific details. Well-known circuits, programming methodologies, and structures are utilized in the present invention but are not described in detail in order not to obscure the present invention.

Certain of the method descriptions which follow are presented in terms of exemplary display images, algorithms, and symbolic representations of operations of data within the computer's memory. As will be known to those skilled in the programming arts, and particularly those skilled in object-oriented programming methodologies, these algorithmic descriptions and graphic exemplary displays are the means used by those skilled in the art of computer programming and computer construction to convey teachings and discoveries to others skilled in the art.

For purposes of this discussion, an "algorithm" is generally a sequence of computer-executed steps leading to a desired result. These steps require physical manipulations of physical quantities. Usually, though not necessarily, these quantities take the form of electrical, magnetic, or optical signals that are capable of being stored, transferred, combined, compared, or otherwise manipulated. It is conventional for those skilled in the art to refer to these signals as bits, values, elements, symbols, characters, images, terms, numbers, or the like. It should be kept in mind, however, that these and similar terms should be associated with appropriate physical quantities inside the computer and that these are merely convenient labels applied to these physical quantities that exist within the computer.

It should also be understood that manipulations within the computer are often referred to in terms such as adding, comparing, moving, etc. which are often associated with mental operations performed by a human operator. It must be understood that no involvement of a human operator is necessary or even desirable in many aspects of the present invention, since the operations described herein (except those specifically identified as origination with the operator or user) are machine operations performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations carried out by a computer, and the method of computation itself. The present invention does not involve a method of computation. The present invention rather relates to methods, steps, or operations for a computer and processing electrical or other physical signals to generate desired physical signals and display results and interactions. As illustrated in FIG. 1, the present invention also relates to a system 10 for performing these operations. Furthermore, it should be understood that the programs, algorithms, etc. described herein are not related or limited to any particular computer or apparatus. Rather, various types of general purpose machines may be used with programs constructed in accordance with the teachings herein, and employed as the workstation 12. Similarly, it may prove advantageous to construct specialized apparatus to perform the method steps described herein by way of dedicated computer systems with hard-wired logic or programs stored in nonvolatile memory such as read only memory.

It is assumed in FIG. 2 that the user has manipulated an image source such as 32 in FIG. 1 and has advanced to a location on a film or videotape to view an exemplary image on a video monitor 40 that is desired for use as a key image. Typically, this will be the first image or last image of a scene, although this is not required and any image could be used.

At step 101, the user enters a command to capture a key frame from the image source; this key frame is captured and stored in digital form in the KFB circuit 78. A key frame at this stage in the disclosed embodiment for color region of interest tracking is a 24-bit color image, with 8 bits each of red (R), green (G), and blue (B) video channels. The key frame image, a color image in the disclosed embodiment, is displayed on the video monitor 40 as it is viewed from the image source; after capture it is displayed in a miniaturized version in an image area in a control window 44 on the workstation monitor.

At step 102, the system determines if a user defined window (UDW) from a preceding frame is available. In the case when the operator is first selecting a color region of interest, there will not be a prior user defined window in existence. On the other hand, after the operator has selected a color region of interest for a given frame, a user defined window associated with this color region of interest will be in existence and stored in the system memory. This priorframe user defined window is employed as a starting window for a subsequent frame. In accordance with methods described herein, the beginning user-defined window from a prior frame is used to define a search area wherein the system begins to search for pixel color values within the predetermined variance of the mean color established for that prior user defined window.

If no user defined window from a preceding frame is available, then at step 104, the user employs a tool to select a point or points in the color region of interest. As will be described, this feature is activated by clicking on a "color grabber" button that causes display of a predetermined cursor.

At step 106, the system computes the mean of the points selected by the operator and displays this mean as a color in a predetermined display region on the display screen 46.

Step 110 shows that the operator can adjust the mean and the variance of the color value so as to provide an adjusted mean.

Using the adjusted mean and variance, at step 112 the system automatically determines the color boundaries of the region of interest by conducting a search algorithm to isolate the x and y coordinates of picture elements that meet the selected criteria of being within a predetermined variance of the mean color value.

Then, at step 118, this region, identified as a color region of interest, is vectorized to obtain a user-defined window (UDW). At step 120, this UDW can be edited and at step 114 stored and retrieved.

At step 118, the isolated key image, which is also called a "key", is vectorized at the workstation to obtain a user defined window (UDW) defined in terms of points, with vectors extending between the points. The term "vectorized" means that a continuous polygon of n points has been drawn around the region of interest, to obtain a set of points which can be connected with (and displayed as) a set of lines. In this disclosed embodiment, UDW's are defined in terms of points within an image space having 586 horizontal lines, with 720 pixel locations per line, where the last point of a set of points defining a window connects to the first point.

After the key image has been vectorized at step 118 to obtain a vector representation of a window, the window can be stored in the workstation's memory as indicated at the optional step 114. Further, a prestored vector window can be retrieved from memory, edited, and re-stored if desired.

At step 120, the user may edit the UDW if necessary or desired. The UDW editing process essentially entails operations of adding, deleting, and/or moving a point, a selected group of points, or an entire window. Windows for editing can be derived directly from the vectorizing step at 118, by free hand drawing with a pointing device (e.g. mouse, graphics or digitizer tablet), or by retrieving a prestored window from storage in the workstation 12, as indicated at 114. Edited windows can also be stored in the workstation's memory.

After the user has created a suitable UDW, it is used to apply image processing, as indicated generally at step 122. In the disclosed system for color correction, using the window to apply processing involves devectorizing the window for a frame of video to thereby obtain a digital key, and employing the key as a mask or matte for applying color corrections. Regions corresponding to one or more windows receive a predetermined set of color corrections, while other regions receive another set of color correction.

For use in a series of frames of a scene, the user associates a first user defined window with a first frame of a scene, typically edits the first frame's window or defines a new window for the final frame of the scene, and then designates the windows as corresponding to the beginning and ending frames of the scene. The preferred system is then automatically operative to employ the first user defined window and automatically track the color region of interest there between during the succession of frames in the scene in order to provide a progressively changing window throughout the frames of the scene. Thus, step 124 in the disclosed embodiment involves applying color correction on a frame by frame basis to regions of each frame in accordance with one or more user defined windows for each frame.

Other types of image processing that can be applied in accordance with user defined windows include image compression, image filtering, animation creation, noise reduction, and colorization. Other types of image processing applications will occur to those skilled in the art.

Example of Color Region of Interest

FIG. 3 provides a specific example of these steps in operation. In this example, an image containing a bottle 150 and a glass 155 on a table cloth is employed as the keyframe, and a key corresponding to only the bottle is derived. In particular, the key comprises the predetermined colored region of the bottle, and also the region 157 (FIG. 3D) comprising the top of the glass, which for purposes of the discussion example, are assumed to comprise a predetermined due, with all the pixel values in the color region of interest being within the predetermined variance of the mean color value selected by the operator.

Figure 3A:
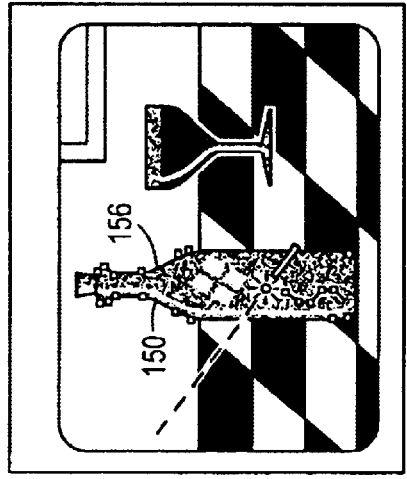
FIG. 3, consisting of FIGS. 3A through 3F, is an illustrative example of the general method carried out in the present invention of capturing a key, selecting a color region of interest, vectorizing to define a window, and devectorizing the window to derive a video matte.

Referring first to FIG. 3A, an original color image is captured and displayed on the video monitor 40 (not shown).

This image is also digitized and displayed in a view/edit window 46 on the workstation monitor. Thus, the video monitor 40 will display the color image, and the view/edit window 46 will display a digitized version of the image for manipulation by the operator. In starting, the user typically selects the key store mode of operation.

Figure 3B:
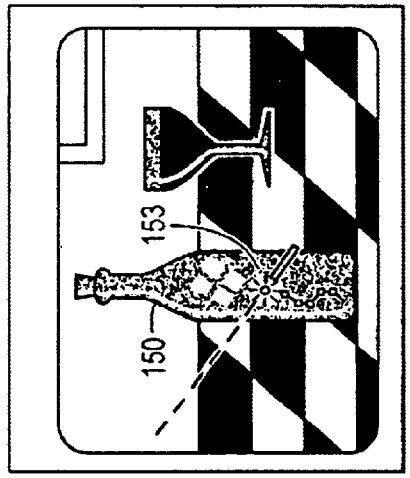

In FIG. 3B, the user has selected the "color ROI" mode of operation and activated the color grabber control, thereby causing display of a "color grabber" icon 153. The operator uses this icon and clicks with the mouse or drags to select one or more points that are employed to determine the mean color of a region of interest. The system automatically calculates the mean and displays it, and the operator can adjust the mean and variance.

Figure 3D:
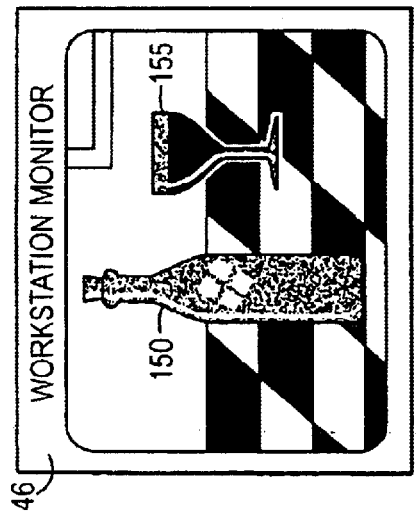
Figure 3C:
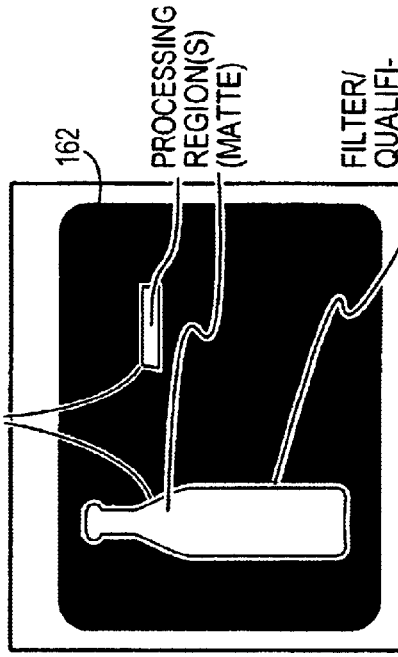

In FIG. 3C, either automatically after a point selection operation or upon provision of a predetermined "detect" command, the color region of interest is automatically vectorized. This results in the display of a vectorized region 156 comprising a continuous polygon overlaid on top of the color image.

In FIG. 3D, the operator can select an "edit" mode wherein the points of the vectorized region 156 are adjusted in location, the mean and variance can be adjusted, or a new region such as that shown at 157 can be added by invoking a predetermined "add region" command.

After the vectorized regions have been modified to the operator's satisfaction, the user can select the 1-bit mode, which effectively completely the conversion of the image into a black and white image, with black regions defining the area of interest that will ultimately define the window for applying image processing.

Figure 3E:
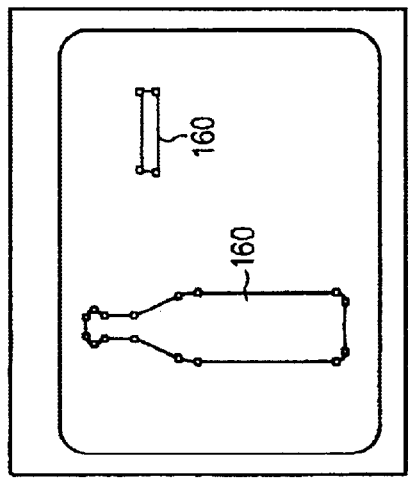
Figure 3F:
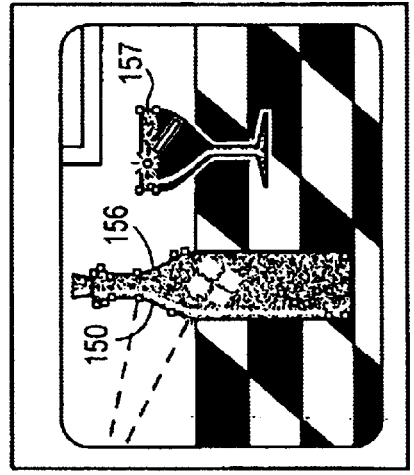

In FIG. 3E, only the vectorized key windows are displayed as vector regions 160. In FIG. 3F, the conversion to the 1-bit key image is complete, leaving two separate key areas or processing regions 165 of the image corresponding to the bottle and the glass.

The vector window(s) 160 are displayed on the workstation monitor, and are preferably overlaid on the key image so the user can visually verify the accuracy of the user-defined window relative to the key image. In the example shown, the vector window comprises a plurality of points connected by piece-wise linear segments. The user may select more or fewer points, as desired, so that the vector window matches the area of interest as closely as possible. The vector window may be edited by adding or deleting points, as desired.

In operation of the system to define windows for a plurality of frames of a scene, the user will define a window for the first frame of the scene and the last frame of the scene, as will be described.

The vectorized user defined window(s) 160 are utilized in the UDW circuit board to create a digital matte that is electronically mixed with the original image to define a region for applying color correction. Stated in other words, the open regions 165 in FIG. 3F receive a predetermined set of color corrections, while the remaining, black region 162 receives zero color correction, utilizing the well-known video key mixing techniques known to those skilled in the art.

In addition, the present invention provides for a softness filter region 170, which is shown as a white outline around the processing region 165. As described in the referenced patent, color corrections are applied in the softness filter region 170 gradually tapering from zero correction at the boundary adjacent the non-processed region 162 (zero percent) to 100 percent processing at the boundary of the processing region 165. The width or gradient of the softness filter region 170 is selectively adjustable by the user.

Figure 4:
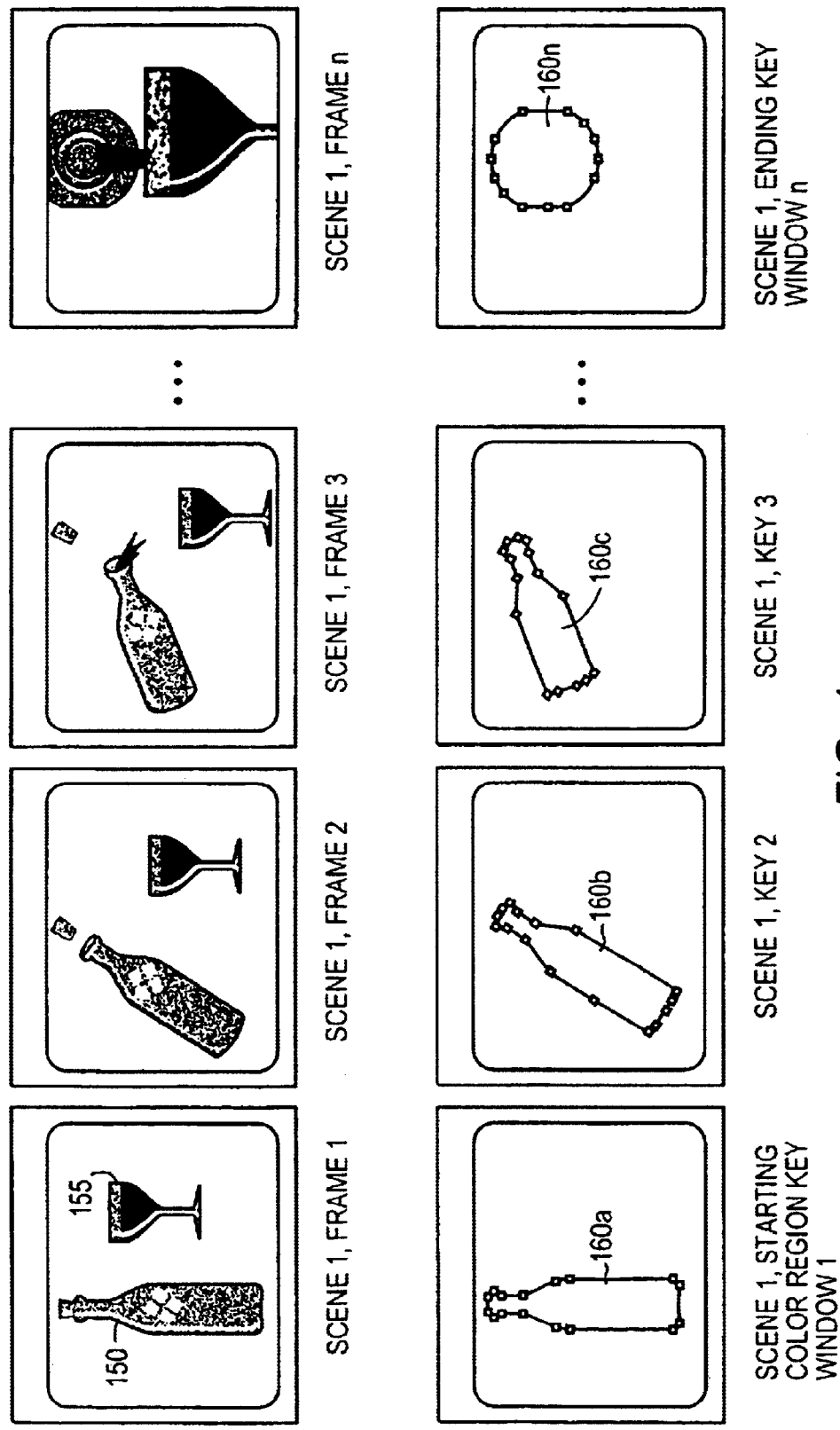
FIG. 4 is an illustrative example of the general method of defining a user definable window associated with a region of interest in a first frame of a scene and autotracking the region of interest to a final frame of the scene.

With the foregoing in mind about the method for creating a user defined window associated with a predetermined color region of interest, turn next to FIG. 4 for an illustration of the application of the method of determining a predefined user defined window associated with a color region of interest in a first frame of a scene and in the final frame of the scene and the manner in which the system automatically tracks the color region of interest through a plurality of scenes in a frame.

Using the example of the bottle and glass, assume that frame 1 of a scene having n frames shows the bottle 150 and glass 155 in an initial position of the screen, as displayed on the video monitor 40 and in the view/edit window 46. As the scene progresses through its frames until the final frame n the bottle is gradually tilted forward, the cork removed, moved in position toward the upper center of the screen from the left of the screen, and changed in orientation from a side view of the bottle to a top view, as the bottle is turned towards the view, with the contents being poured into the glass. Thus, the bottle changes its position, size, and geometry (shape) from frame one to frame n. However, the mean color of the bottle does not change as the bottle changes its position, size, and geometry.

With the present invention, the user-defined window 160 effectively transforms its shape from the elongate bottle to a circle throughout the n frames. The system is automatically operative to detect the mean color in the region of interest defined by the starting color region key 160$a$ detect that predetermined color in the successive frames 2, 3, . . . n etc. and to vectorize the color region of interest so as to define the regions for applying image processing. At any point along the way, the operator may freehand draw a window, derive a new key from the video image of a frame, add a new key or region of interest, use a prestored key such as a circle or square, or may use a prestored window derived from a prior frame and edit the characteristics to define a region such as that shown at 160$n$.

In order to effect an orderly transition between geometry over a number of frames, the user may want to maintain a correspondence between the points of the starting window 160$a$ and the ending window 160$n$. Typically, this correspondence is maintained by providing the same number of points in the ending key window or vector 160$n$ as in the starting key window or vector 160$a$. The number of points is selectably adjustable by the operator.

In the referenced patent, there is a mapping between predetermined points and a starting and ending key window. In the present invention, there is no need to maintain a correspondence between particular points in the key windows, and the key windows are employed merely to define the color region of interest.

A preferred approach when a user-defined window changes shape, size, and position is for the operator to work backwards from a window for a final frame and edit the window of the final frame to derive a window for the first frame by adjusting the color parameters so that the mean hue and variance from the mean effectively capture the region of interest throughout the plurality of frames. In this approach, the operator views the last frame of a scene and determines the number of points required to represent the user-defined window for the region of interest. This number of points is then noted as a minimum number of points for use as the starting window. The user then views the window for frame 1 and adjusts the color parameters as appropriate.

It should be understood at this juncture that the number of frames defining any given "scene" is completely up to the discretion of the operator. If the transformation of the region of interest between a starting window and an ending window is not acceptable, the user may define a subscene comprising a smaller number of frames that provides a more satisfactory transition. The capability of assigning any number of frames to a scene is provided in the preferred RENAISSANCE 8:8:8™ color correction system.

Of course, the ultimate worse case operation is to create and assign a user defined window to each frame individually, but in most cases this will not be necessary. The present invention allows storage of a plurality of user defined windows, each having a number of points, limited only by the total number of points defining such windows for each frame of a program. As described in greater detail below, the total number of points in the user defined windows is limited to a number that allows the UDW board 75 to devectorize all windows and create the digital matte on a real time basis, which is 200 in the disclosed embodiment.

UDW Generator Circuit

The user definable window (UDW) generator circuit 75 employed in the preferred system shown in FIG. 1 is described in detail in the referenced patent. Further details will not be provided herein. As described, the UDW board is operative to receive a command stream from the RTC circuit 70 comprising vector window definitions, and convert these vectorized windows into a digital mattes or keys that can be employed by other digital signal processing circuitry to mix with the digital video signal to selectively apply image processing such as color correction with the predefined regions of interest.

The softness filter 300 employed in the UDW circuit 75 is also described in the referenced patent, and will not be described further herein.

Figure 5:
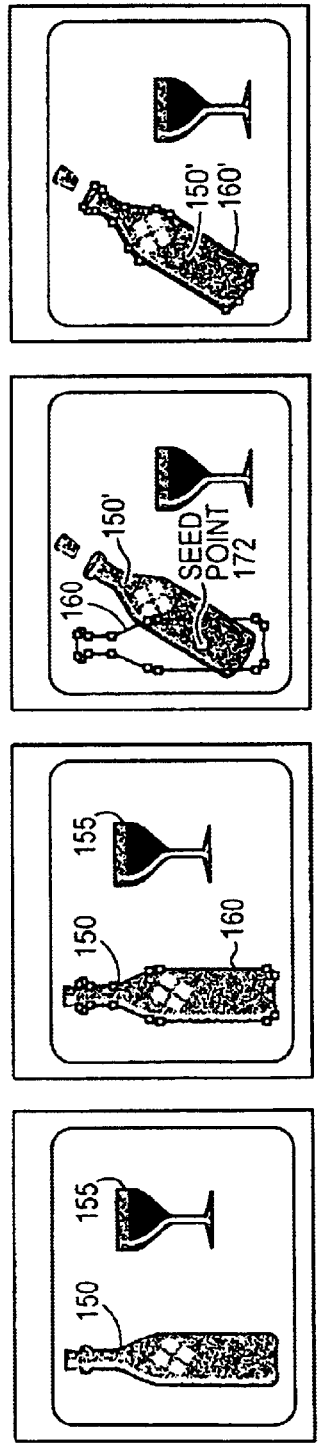
FIG. 5 is an illustrative example of the employment of a user defined window from a prior frame to provide the starting point for a search for the color region of interest in a subsequent frame.

FIG. 5 is an illustrative example of the method carried out in the present invention whereby a user-defined window associated-with a selected color region of interest for a first frame is employed in a second frame to facilitate definition of a subsequent region of interest and user-defined window in the subsequent frame. The present invention operates under the assumption that a particular color region of interest between two immediately consecutive frames will not change significantly in size, position and shape between such consecutive frames. Accordingly, the user-defined window from a prior frame is employed as a beginning user-defined window for a subsequent frame; steps are taken to employ this user-defined window as a search region to begin a search for the color region of interest.

Assume in FIG. 5 that the color region of interest is defined by the bottle 150. In the second diagram, the selected region of interest is shown with its associated vectorized user-defined window 160. In frame 2 of the scene, note that the position and orientation of the bottle has changed to a tilted position. In the present invention, the vector region 160 from the prior frame (frame 1) is utilized as a starting vector region of interest for a subsequent frame (frame 2). This starting vector region is employed to define a region of search for pixels having a color value within the variance of the mean employed to define the color region of interest. Preferably, the search begins at a predetermined "seed point" 172, such as the calculated center of gravity of the polygon defining the vectorized region 160. Starting with the pixel associated with the seed point, the system searches the pixels in a predetermined manner so as to identify pixels having a color value within the predetermined variance of the mean. After the search and redraw of the polygon, the new vectorized region of interest 160' is drawn.

Figure 6:
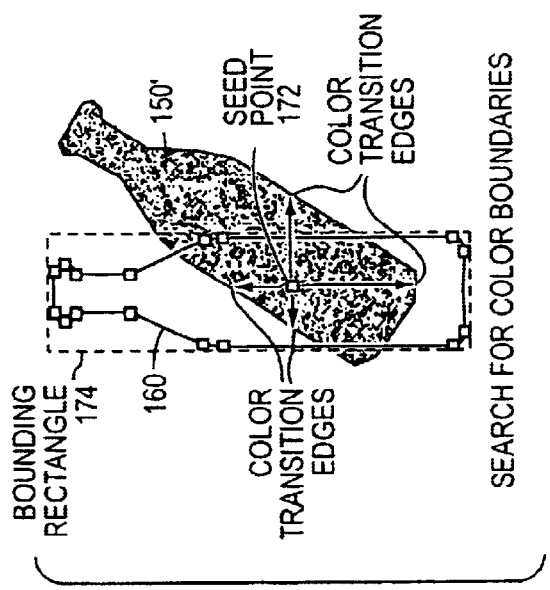
FIG. 6 illustrates the seed point of a region of interest.

FIG. 6 illustrates a search from the color boundaries beginning at the seed point 172 so as to determine the region of interest defined by the tilted bottle 150'. In the preferred embodiment, the seed point 172 is calculated by determining the center of gravity of the vectorized user-defined window such as that shown at 160. Those skilled in the art will understand how to compute and determine the center of gravity of a geometric polygon based on well-known programming techniques.

Furthermore, in the present invention, a bounding rectangle 174 is defined that encloses the entire polygon 160 and defines an outer search limit.

The searching methodology is as follows: beginning at the seed point 172 of the vectorized region of interest 160 from the preceding frame, the RGB values of the pixel at the seed point are examined to determine whether or not they satisfy the criteria of being within the predetermined variance of the mean value of the color of interest. In most cases, this will result in a "yes" determination. The system begins by searching first to the left of the seed point until it encounters a predetermined color boundary defined by a predetermined color value outside of the mean and variance. This point is identified as a left-most color transition edge. In like manner, the system searches from the seed point to the right to determine a color transition edge, to the top, and then to the bottom to determine four color transition edges. These four points then define initial boundaries for further searching.

Those skilled in the art will understand that a number of different algorithms for searching can be employed, including but not limited to an inverted spiral search and a simple progressive scan in x and y from the seed point.

Furthermore, the preferred algorithm will employ methods that terminate the search in the event that the maximum geometric boundary such as that of the bounding rectangle 174 are exceeded to change search methodology to that of random searching or in the worse case a progressive scan of every value in the array.

Furthermore, the vectorized regions of interest and their respective centers of gravity can be employed to determined a trajectory, velocity and acceleration for the center of gravity. Such methodologies can be employed to project the direction and rate of change of the region of interest so as to locate a seed point for searching of the next frame at a position within a subsequent frame corresponding to that of the velocity and/or acceleration of the region of interest across one or more frames.

User Interface of Software for Automatic Region of Interest Tracking

Figure 7:
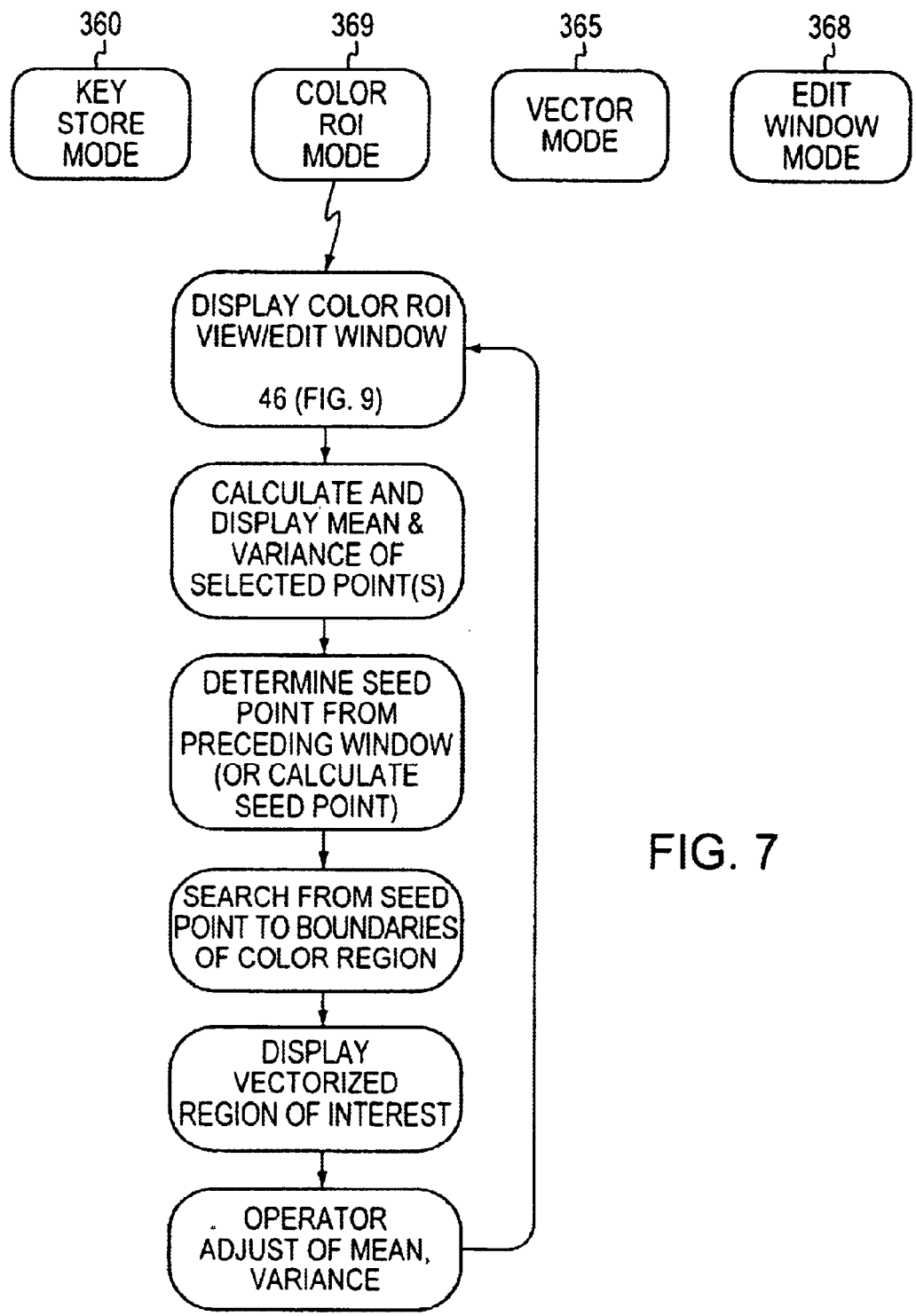
FIG. 7 is a state diagram illustrating various modes of operation of the preferred system.

FIG. 7 is a state diagram illustrating the various modes of operation of a system constructed in accordance with the preferred embodiment of the present invention. These are the principal modes of the software that runs on the workstation 12 to provide the basic operations of capturing a key frame, isolating a region of interest based on color or on another parameter, vectorizing the region of interest to create a user defined window, editing the window(s) for association with particular image frames in a scene, and automatically tracking the region of interest through a plurality of frames.

The software primarily executes in four basic modes-a keystore mode 360, a vector mode 365, an edit window mode 368, and a color region of interest (ROI) mode 369.

Each mode results in the generation of particular user interface displays or windows (as contrasted with user defined windows) on the workstation monitor 15—control windows and view/edit windows—with corresponding displays on the video monitor 40, which collectively allow user interaction with the system. Within the principal modes, certain types of operations are possible which are appropriate for the task at hand.

The three modes of operation of keystore mode 360, vector mode 365, and edit window mode 368 are described in the referenced patent and will not be repeated herein. Thus, the discussion which follows is primarily focused on the color ROI mode 369.

Figure 8:
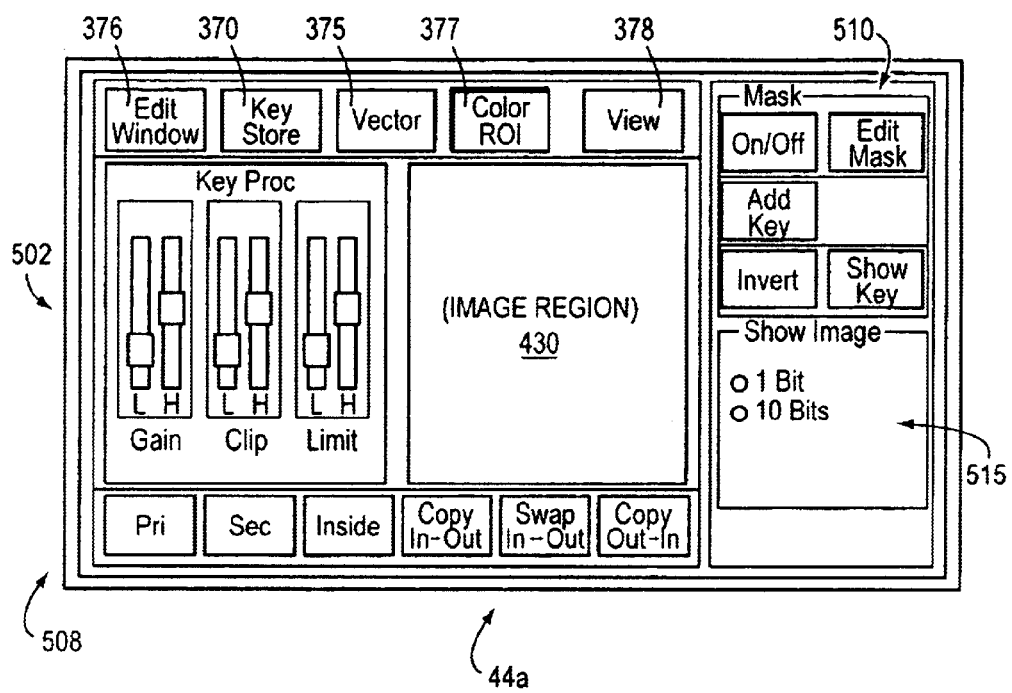
FIG. 8 illustrates an image capture control window displayed in the keystore mode.

Operation within the various modes results in display of various user interface or control windows such as an image capture window 44 and view/edit windows 46 on the workstation monitor. FIG. 8, for example, illustrates a control screen 44a that is displayed in the keystore mode 370. The control screen 44a is the initial control screen that comes up when the workstation software is initiated, but other types of control windows are displayed in other modes of operation.

In each control window 44, selection between the keystore mode, the vector mode, the edit window mode, or the color ROI mode is made by pressing (i.e. clicking with the mouse) a Key Store button 370, a Vector button 375, an Edit Window button 376, or a Color ROI button 377. Selection of these buttons by the operator activates the corresponding mode.

Still referring to FIG. 8, a View button 378 turns on and off a view/edit window whose contents vary depending upon the mode. The control window 44 includes an image region 430 that displays a small version of the image, user defined window, etc. When the user selects the View button 378, a larger version of this image is displayed in a separate view/edit window 46, of which there are different types. In the case of the Color ROI button 377, a view/edit window 46 as shown in FIG. 9 is displayed.

Other details of the buttons in the image capture control window 44a in FIG. 8 are provided in the referenced patent.

Figure 9:
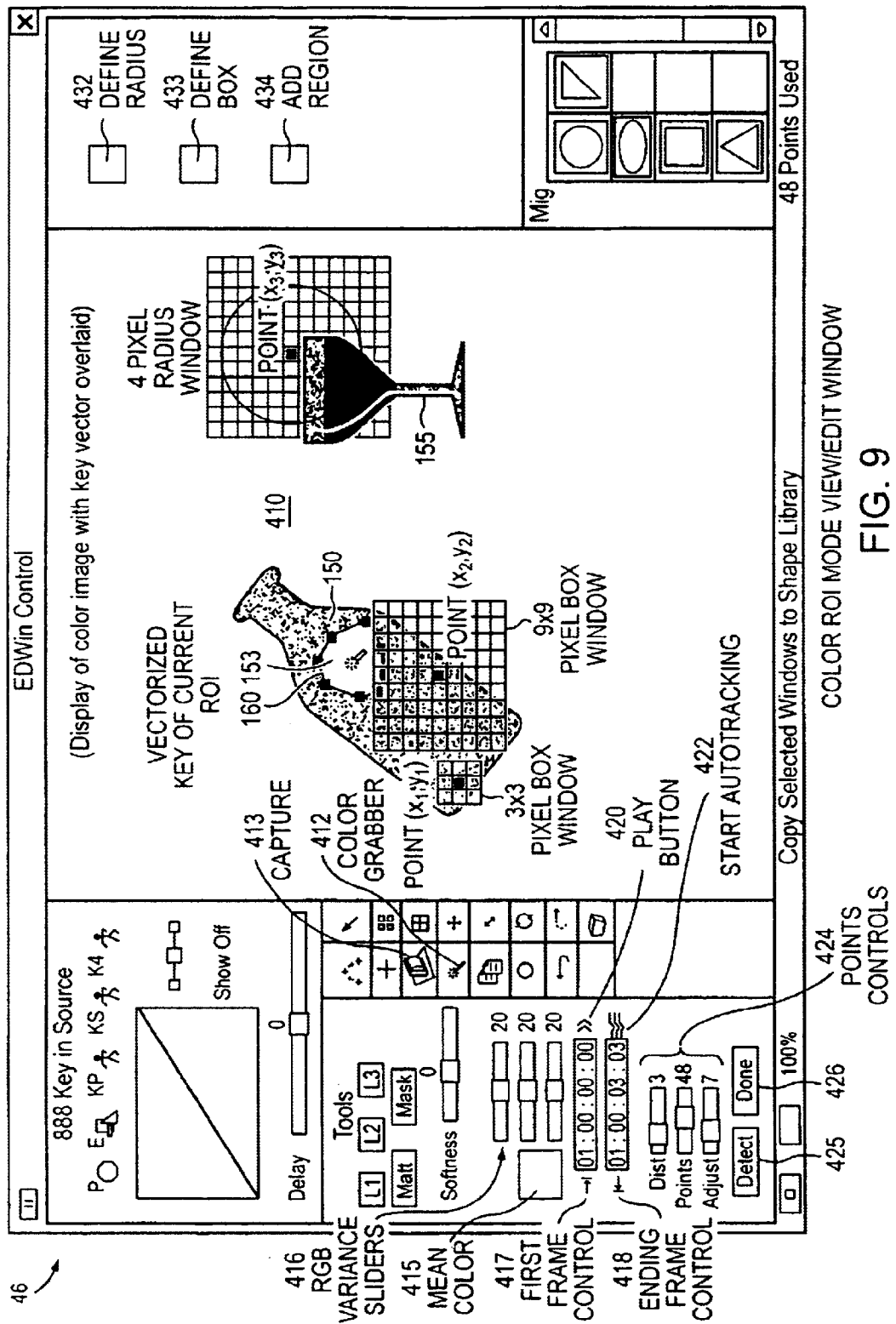
FIG. 9 illustrates a color region of interest (ROI) mode view/edit window.

Referring now to FIG. 9, the Color ROI view/edit window 46 is displayed in the color ROI mode. This window 46 includes a display region 410 where the, color image being operated upon is displayed, with an overlay of the key vector or user-defined window 160. In the example given, the partially rotated bottle from prior figures is displayed, with a vectorized key of the current region of interest 160 comprising a closed polygon displayed superimposed over the color image.

In connection with automatic region of interest tracking, a number of controls are provided. First, a color grabber button 412 when depressed causes display of a "color grabber" cursor icon as shown at 153.

A mean color display region 415 provides a visual display of the average or mean color as determined by the system, in response to selection of a point or points by the operator.

A plurality of variance sliders 416, one for each of the red, green, and blue channels, is provided to adjust the variance from the mean. The operator can adjust the variance between a minimum of zero and a maximum of 256 possible values (an 8-bit variance is provided). A selected variance of 20 is shown in FIG. 9 for each of the three variance sliders. Adjustment of these variance sliders controls the variance from the mean that a given pixel color value can assume while still being included within the color region of interest. If a color pixel value assumes a value within the variance parameter of the mean, that pixel will be included within the color region of interest and will be enclosed within the vectorized key 160.

A first frame control button 417 is provided to allow the operator to select and/or rewind to the first frame of a scene for manipulation. An ending frame control button 418 is provided to allow the operator to select and/or advance to the ending frame of a scene.

A play button 420 is provided for commanding the system to display the frames in the scene for viewing by the operator. A "start auto tracking" button 422 is provided to allow the operator to command the system to begin with a region of interest defined in a first frame and track the particular region of interest in successive frames, one frame at a time.

A plurality of points controls 424 are provided to allow operator adjustment of the number of points (Points) in the closed polygon comprising the vectorized key such as 160, and the minimum distance between points (Dist).

A Detect button 425 is provided so that the operator can command the system to initiate the process of calculating the mean and detect colors in the image within the predetermined variance of the mean.

A Done button 426 is provided so that the operator can signal to the system that operation with this particular window in this mode are completed.

FIG. 9 also illustrates the provision of predetermined boxes or radius around a selected point for computing the mean color value. For example, a predetermined pixel ($x_1$, $y_1$) is shown within the region of the bottle 150. A 3×3 pixel window or "box" is shown surrounding this pixel. By selecting the "Define Box" button 433, the operator can command the system to define a box of predetermined size for use in computing the mean. The system is automatically operative to compute the mean color value of the pixels within the 3×3 box surrounding the selected pixel. The pixel is selected with a click operation.

Similarly, the pixel at location is shown in a 9×9 pixel window. The system is automatically operative to computer the mean color value of the pixels within the 9×9 window.

Alternatively, the user can define a predetermined radius around a selected point, as shown at the point ($x_3$, $y_3$). The point ($x_3$, $y_3$) is shown within a portion of the glass 155, with a circle defined by a four-pixel radius around the point. If the operator selects the "Define Radius" button 432, the system determines the average color value within a radius of n pixels measured from the center point (as defined by a click).

For this purpose, a Define Radius button 432 is provided in the window 46. Activating this button causes display of a predetermined dialog box that allows the operator to set the radius around a selected point. The point is selected by a click operation when in the "Define Radius" mode.

A "Define Box" button 433 is provided so that the operator may define a predetermined square box comprising a predetermined number of pixels around a selected point as shown for the points ($x_1$, $y_1$) and ($x_2$, $y_2$).

Finally, an Add Region button 434 is provided. Actuating this button allows the operator to "freeze" and save a particular vectorized key such as that shown at 160, and activate a mode wherein a new mean value can be selected so as to allow creation of another, second vectorized key for another region of interest in the same image.

Other tools, not forming a part of the present invention, are also provided in the preferred system so as to allow other types of image manipulation, some of which is described in the referenced patent.

From the foregoing, those skilled in the art will appreciate that a number of different tools are provided in a system constructed in accordance with the present invention that allow the user to create and edit user defined windows—either windows created from an immediately preceding vectorizing operation carried out on a key image, or windows previously created during prior operations and stored in the memory of the workstation. After any desired window editing operations, the user defined window (or windows, as plural windows are permitted in the preferred embodiment) is associated with a selected frame of a scene, and the controls in the control screen 44 activated to cause image processing to occur in accordance with the commands issued, e.g. apply color correction.

Preferred Software Methods

Figure 10:
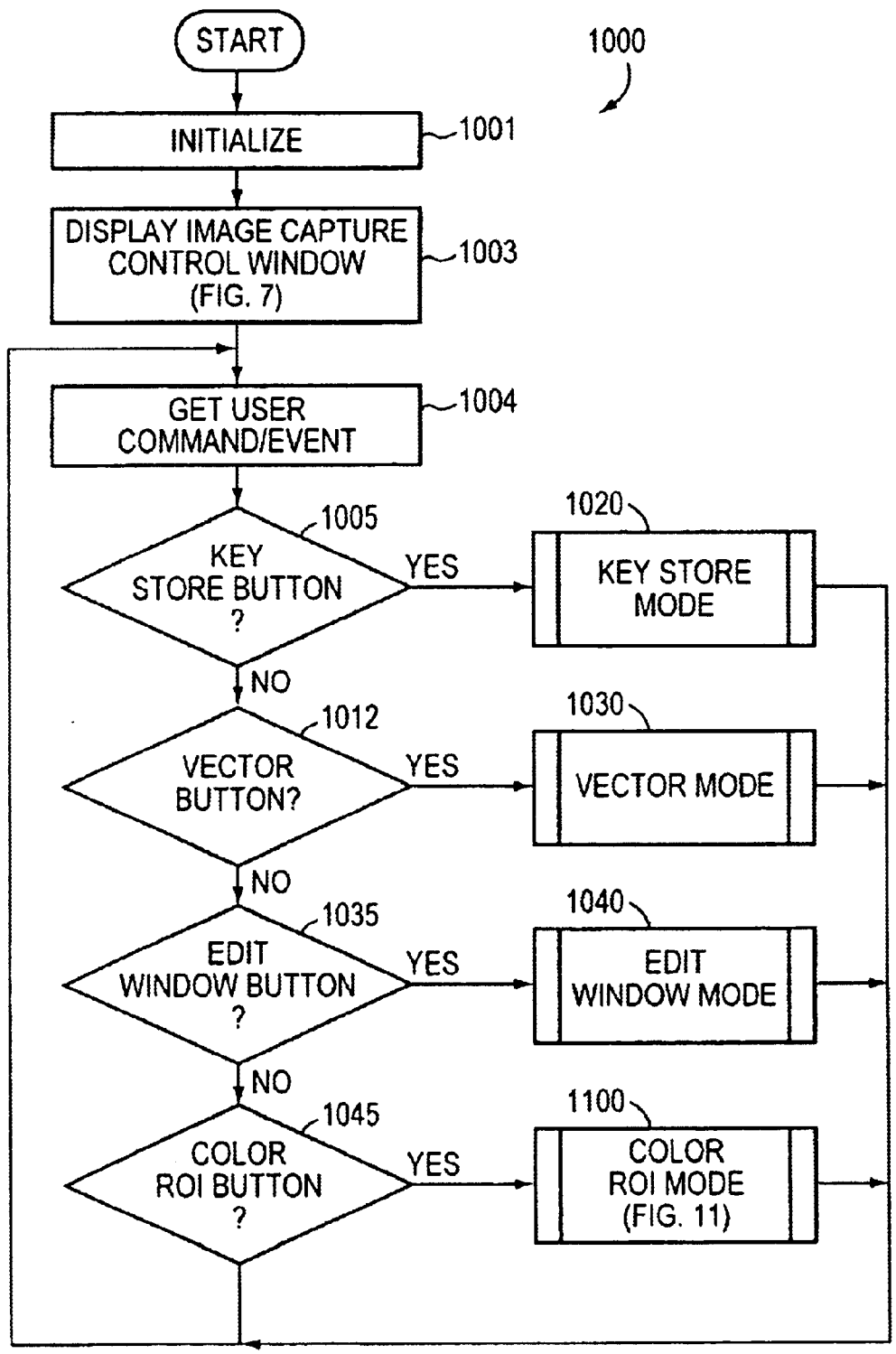
FIG. 10 is a flow diagram of relevant aspects of the preferred workstation software that carries out the computer-implemented process employed in the present invention.

FIG. 10 is a flow chart illustrating the steps of a computer-implemented process 1000 carried out in the work station 12 to carry out methods of the present invention described herein. These steps include steps for capturing a keyframe, isolating a color region of interest for defining a key, deriving a user-defined window from the key, and applying image processing in accordance with the user-defined window for a sequence of frames in a scene. The sequence of steps in this figure relates to a method for deriving a key and corresponding window for a first frame of a scene, deriving a key and corresponding window for subsequent frame of a scene, automatically tracking the color region of interest over a selected number of frames in the scene, and applying image processing across the frames in the scene. In particular, the reader is referred to FIGS. 3, 4 and 5 as illustrative examples of the method as carried out.

Starting at step 1001, the first step taken is to initialize the system and load the software for the workstation 12 by allocating a region in memory for handling the software processes and storing relevant data. At step 1003, the image capture window (or other suitable starting display window) such as that shown in FIG. 7 is displayed.

At step 1004, the program enters an infinite loop of getting a user command or receiving an event that drives subsequent actions. Those skilled in the art will understand that the preferred software is event-driven and actions occur as a result of a user typing a command, pointing with the cursor and clicking on an object (such as a control), clicking and dragging, etc.

At decision step 1005, the inquiry is made whether the Key Store button has been depressed. If so, process 1020 is executed and the system enters the key store mode. Steps associated with the key store mode of operation are described in the referenced patent.

If the Key Store button has not been pressed, at decision step 1012 the inquiry is made whether the Vector button has been pressed by the user. If so, process 1030 is executed to enter the Vector mode. Steps associated with the vector mode of operation are described in the referenced patent. If not, at decision 1035 the inquiry is made whether the Edit Window button has been pressed by the user. If so, process 1040 is executed and the system enters the edit window mode. Steps associated with the Edit Window mode of operation are described in the referenced patent.

If at step 1035 the Edit Window button has not been pressed, control passes to decision 1045, where the inquiry is made whether the Color ROI button has been pressed. If so, the process 1100 is executed. Steps associated with the Color ROI mode of operation are described in connection with FIG. 11.

Figure 11A:
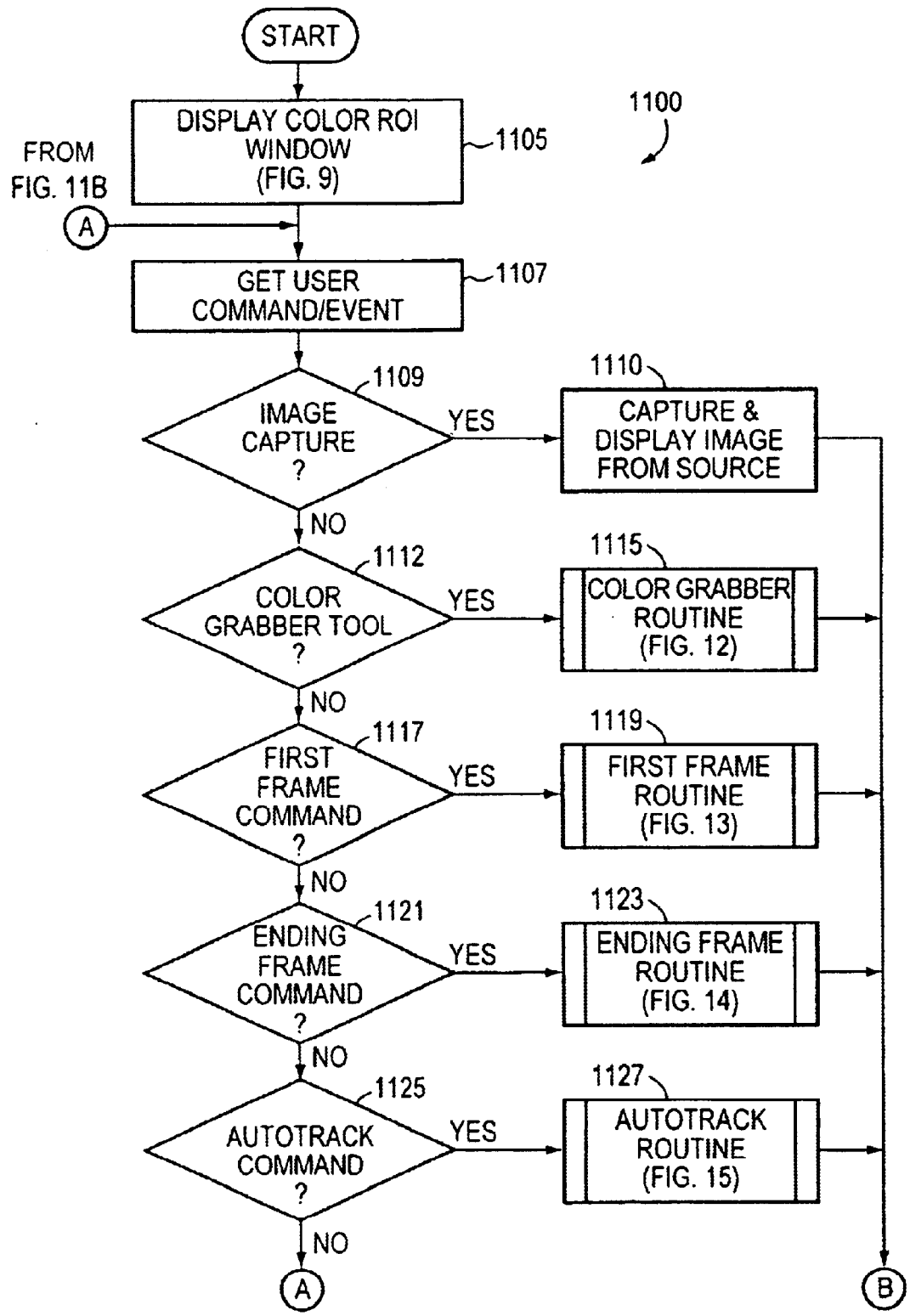
FIG. 11, consisting of FIGS. 11A and 11B, is a flow diagram of the color region of interest computer-implemented process.
Figure 11B:
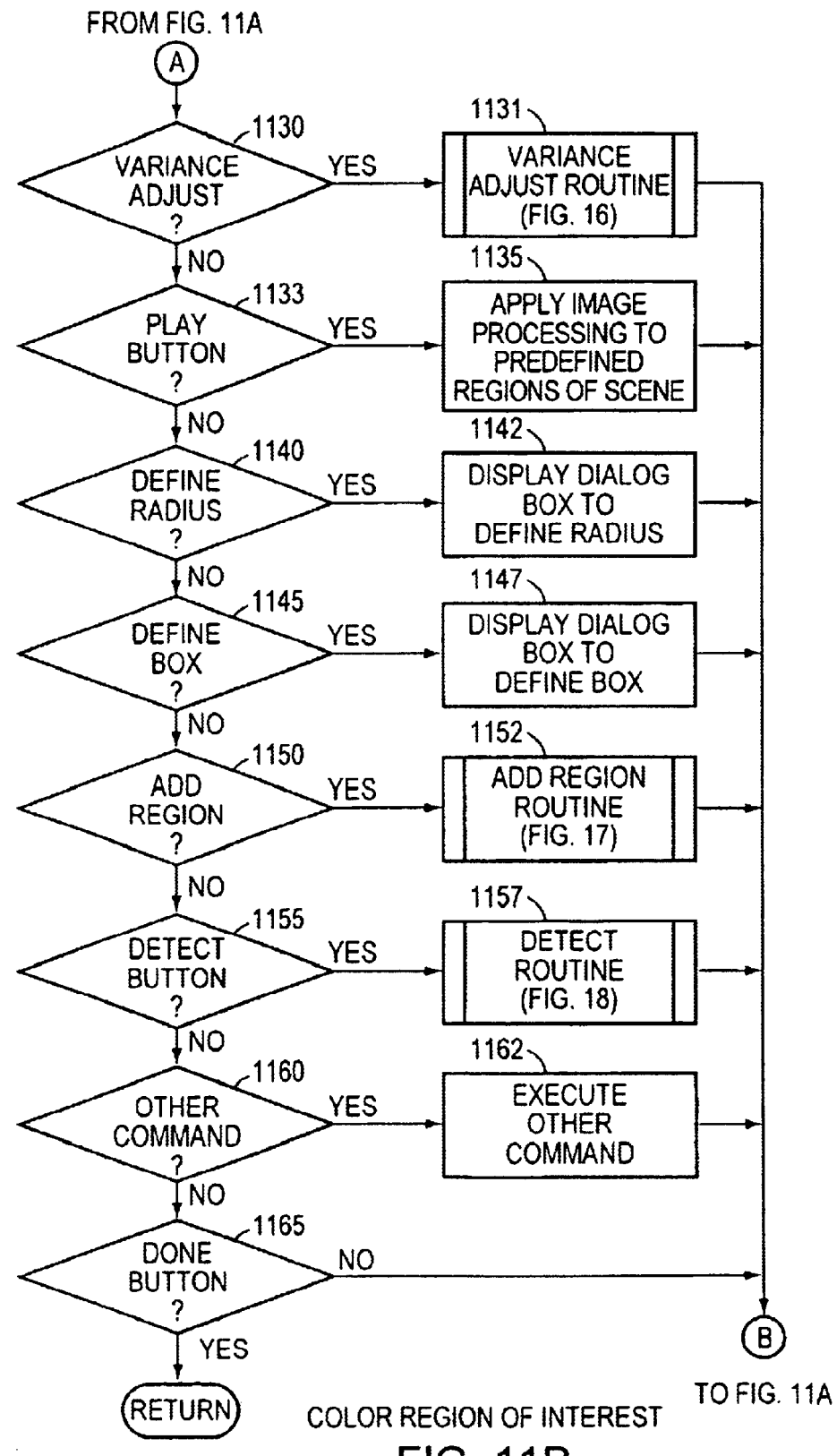

FIG. 11 illustrates the steps of the process 1100 associated with the color region of interest (ROI) mode of operation. The first step taken at step 1105 is to cause display of the color ROI window 46, a type of view/edit window, as shown in FIG. 9. Control then passes to step 1107 where the system enters an infinite loop to scan for user commands or events. For purposes of the present invention of determining a color region of interest and autotracking the region of interest over a plurality of frames, several of the control buttons shown in FIG. 9 will be actuated by the operator.

If at decision 1109 the Capture button 413 has been pressed (FIG. 9), step 1110 is carried out to capture and display an image from the image source.

If at decision 1112 the "color grabber" tool button 412 (FIG. 9) has been pressed, process 1115 is executed to carry out a color grabber routine,. Steps associated with the color grabber routine are described in connection with FIG. 12.

If at decision 1117 a first frame command has been provided by depressing the First Frame control button 417, a First Frame routine is carried out at 1119. Steps associated with the First Frame routine are described in connection with FIG. 13.

If at decision 1121 an Ending Frame command is provided by depressing the Ending Frame control button 418 (FIG. 9), an Ending Frame routine 1123 is executed. Steps associated with the Ending Frame routine are described in connection with FIG. 14.

If at decision 1125 an Autotrack command is provided by depressing the Start Autotracking button 422 (FIG. 9), an Autotrack routine 1127 is executed. Steps associated with the Autotrack routine are described in connection with FIG. 15.

If at decision 1130 a Variance Adjust command has been provided by actuation of one of the RGB variance sliders 416 (FIG. 9), a Variance Adjust routine 1131 is executed. Steps associated with the variance adjust routine are described in connection with FIG. 16.

If at decision 1133 the Play button 420 (FIG. 9), has been actuated, step 1135 is carried out to apply image processing to the predefined regions of the scene. Although step 1135 is a process, those skilled in the art will understand that the image processing as described in the referenced patent are applied in the manner described therein. Such image processing is applied to each frame within the scene in real time so that the operator can observe the effects of the isolation of the region of interest and application of the image processing such as color correction within the region of interest defined for each frame in the scene.

If at decision 1140 the Define Radius button 432 (FIG. 9) has been actuated, step 1142 is carried out to display a dialog box to the operator. Although the step 1142 is a separate process, it will be understood that this dialog box allows the user to enter a number as a radius so that a subsequent operation for computing the mean color is carried out on all pixels within the predefined radius.

If at decision 1145 the Define Box button 433 (FIG. 9) has been actuated, step 1147 is executed. Step 1147, a separate process, is operative to display a dialog box that allows the operator to define the size of a pixel window such as that shown in FIG. 9 as a 3×3 or a 9×9 window. Other sizes of boxes are also possible. The system is operative in response to compute the color mean for all pixels surrounding a click point as defined by the size of the window or box.

If at decision 1150 the Add Region button 434 (FIG. 9) has been actuated, an Add Region routine 1152 is executed.

In this routine, steps are carried out for saving a particular user-defined window and entering a mode wherein the operator can define and select a second user-defined window within the same frame. Steps associated with the add region routine are described in connection with FIG. 17.

At decision 1155, the inquiry is made whether the Detect button 425 has been actuated. If so, a Detect routine 1157 is executed. The Detect routine is operative to utilize the predetermined mean color value and detect all pixels having a color value within the indicated variance as controlled by the RGB variance sliders and include those within an area which is then vectorized. Steps associated with the Detect routine are described in connection with FIG. 18.

At decision 1160, the inquiry is made whether another command that is appropriate for the window 46 in FIG. 9 has been provided. If so, an appropriate command is executed as shown at step 1162. Finally, at decision 1165, the inquiry is made whether the Done button 426 has been actuated. If so, the "yes" branch is taken and the color region of interest routine exits and returns control to the calling processes. If not, the program loops back to yet another user command or event at step 1107.

Figure 12:
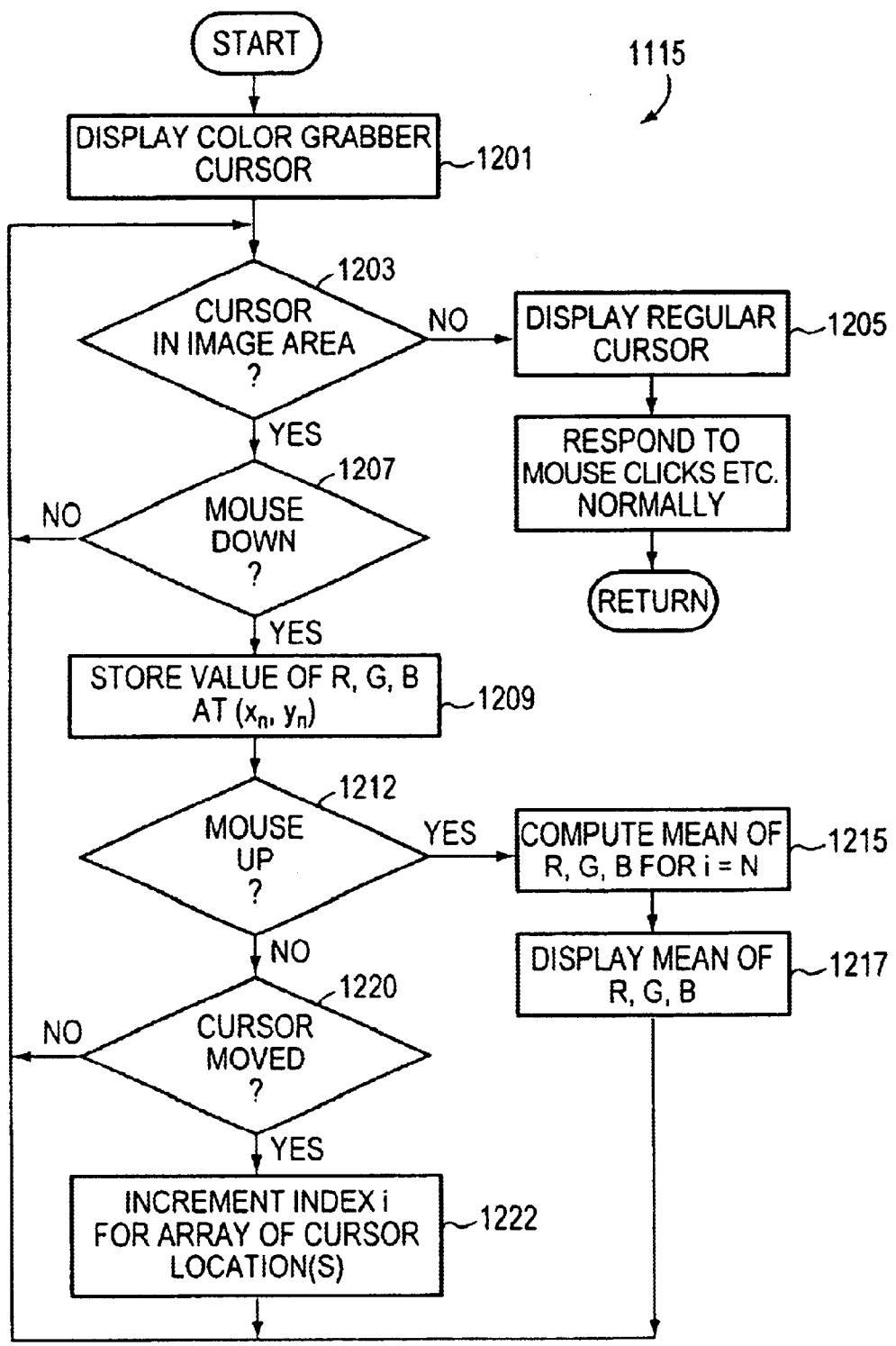
FIG. 12 is a flow diagram of a color grabber computer-implemented process.

FIG. 12 illustrates the Color Grabber routine 1115 that is carried out in response to activating the Color Grabber button 412 in FIG. 9. The first step taken at step 1201 is to display the Color Grabber cursor such as that shown at 153 in FIG. 9. At decision 1203, the inquiry is made as to whether the cursor is in the image area 410. If not, at step 1205 the regular cursor is displayed, and the system is operative to respond to mouse clicks in the normal manner in regions outside the color image area.

If on the other hand the cursor is in the image area, the inquiry is made at decision 1207 as to whether the mouse, button is down. If not, no particular action is taken and the program loops back to decision 1203. If the mouse is down, control passes to step 1209, since a potential click or drag operation has been indicated. The instantaneous value of the red, green, and blue color values at the location of the cursor as indicated by the variable $(x_n, y_n)$ is stored in an array for use in computing the mean color value. Control passes to decision 1212.

At decision 1212, the inquiry is made as to whether the mouse button has been released (mouse up). If so, the "yes" branch is taken to step 1215, and the mean is computed for all of the values in the array that have accumulated since the mouse button was depressed. At step 1217, the computed mean is converted into a color and displayed within the mean color region 415 on the view/edit window 46 (FIG. 9).

If at decision 1212 the mouse is still depressed, the "no" branch is taken to decision 1220. At 1220, the inquiry is made whether the cursor has been moved. If not, control passes back to decision 1203. If so, control passes to step 1222 where an index (i) for tracking the possible movement of the cursor within the region of interest is incremented so as to add another value for purposes of computing the mean. Control then passes back to decision 1203.

The process 1115 continues to execute until the user presses the Done button, or actuates another command.

It will be understood that the steps shown in FIG. 12 are operative to employ either a single click which results in a single value being employed as the mean color value, or to accumulate a number of color values such as when the user drags the cursor within the image area so as to signify that a plurality of color values are to be employed in determining the mean color for purposes of detecting the color region of interest.

FIG. 13 illustrates the First Frame Routine 1119 that is executed in response to the operator's actuation of the First Frame Control 417 (FIG. 9). The first step taken at 1301 is to display the first frame of the current scene. At step 1305, the prestored vector key derived for the first frame is retrieved from memory, and at step 1307, the vector key is displayed overlaid on the image in the View/Edit window 46 in the color ROI. If desired, the operator can edit the vectorized key by adding or deleting points, adjusting the distance, etc. using the point controls 424 (FIG. 9.).

FIG. 14 illustrates the Ending Frame routine 1123 that is activated in response to the operator's actuation of Ending Frame control button 418 (FIG. 9). The steps of this routine are identical to that of the First Frame routine except that the actions apply to the ending frame of the scene.

Figure 15:
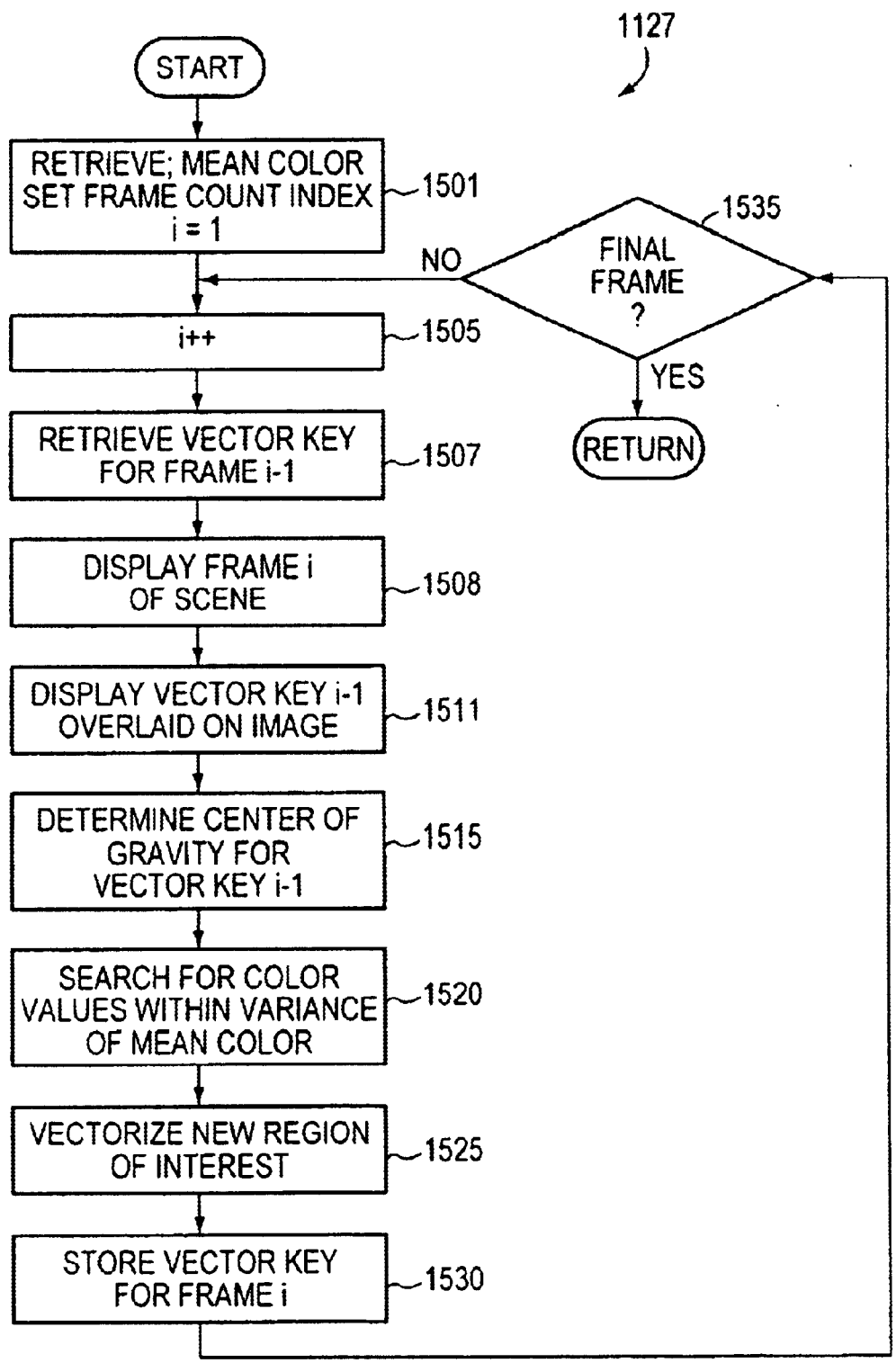
FIG. 15 is a flow diagram of an autotrack computer-implemented process.

FIG. 15 illustrates the Autotrack Routine 1127 that is executed in response to the operator's actuation of the Start Autotracking button 422 (FIG. 9). The first step taken at 1501 is to retrieve the mean color value and initialize a frame count index i=1. This initializes the routine to begin autotracking at the initial or beginning frame being viewed by the operator.

At step 1505, the frame count index i is incremented to advance to the next frame. At step 1507, the vector key for frame i−1 is retrieved so as to obtain a starting key for beginning the search algorithm to locate the color region of interest. At step 1508, the system displays frame i of the scene. At step 1511, the vector key for frame i−1 is overlaid on the image for viewing by the operator. At step 1515, the system determines the center of gravity for the vector key for frame i−1 to determine the seed point.

At step 1520, the system begins at the seed point to execute an algorithm for searching for color values that are within the predetermined variance of the mean color. This results in determination of a region of pixels, not necessarily continuous or contiguous, that can be satisfactorily vectorized.

Then, at step 1525, the region of interest identified for all color values meeting the criteria of values within the variance of the mean color are vectorized. At step 1530, the vector key for the current frame i is then stored. Control passes to decision 1535, where the inquiry is made whether the final frame of the scene for autotracking has been reached. If not, control passes back to step 1505 and the next frame is processed. The final frame has' been reached, the "yes" branch is taken and the routine exits.

Figure 16:
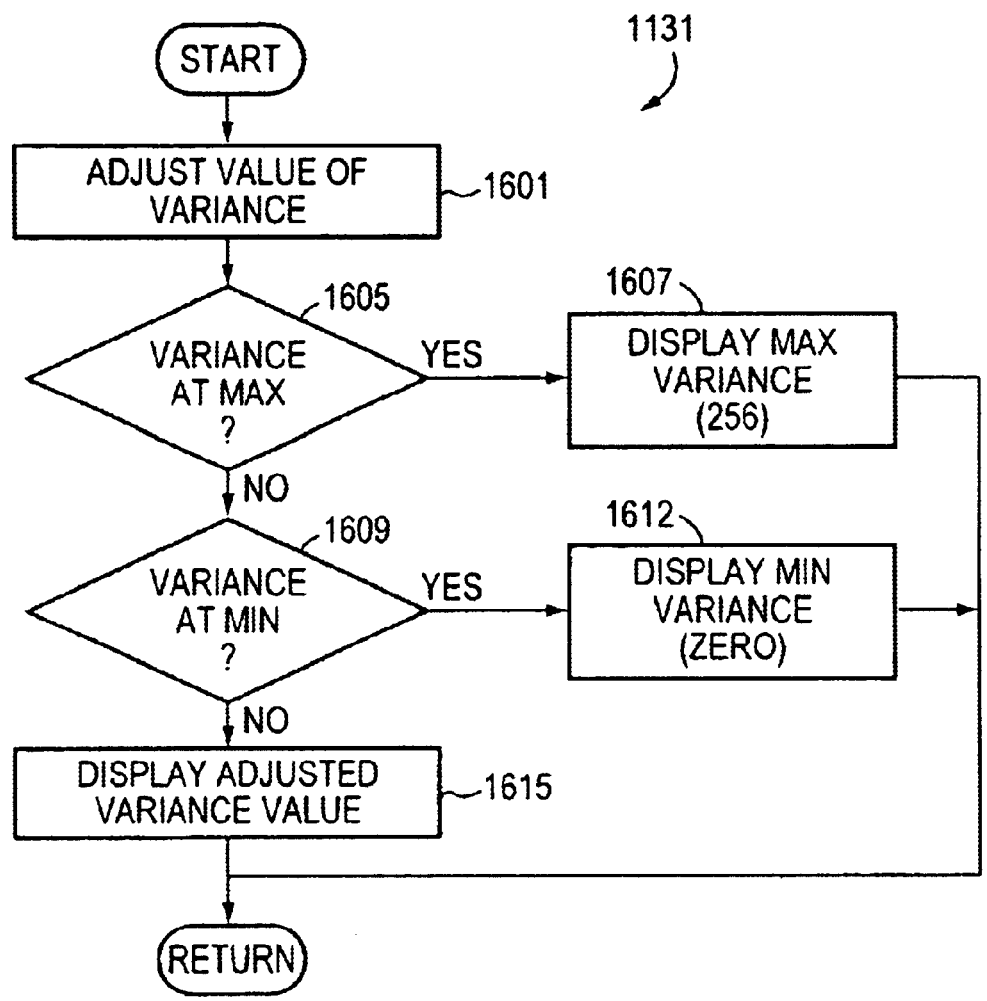
FIG. 16 is a flow diagram of a variance adjust computer-implemented process.

FIG. 16 illustrates the Variance Adjust routine 1131 that is executed in response to the operator's movement of the RGB variance sliders 416 (FIG. 9). Starting at step 1601, the first step taken is to respond to movement of the slider bars. It will be understood that because the described system is an event-driven system, movement of any one of the three slider bars for R, G, and B channels causes execution of this routine. Thus, the predetermined variance value associated with the channel is then adjusted in accordance with the motion of the slider bar associated with the channel.

At step 1605, an inquiry is made as to whether the variance for the selected channel is at its maximum value. If so, at step 1607 the maximum variance value (256) is displayed on the screen and employed as the maximum variance.

If at decision 1605 the variance is not at its maximum, the inquiry is made at step 1609 whether the variance is at a minimum value. If so, the minimum variance (0) is displayed. If the variance is not at its minimum value, then control passes to step 1615, and the adjusted variance value is displayed and employed as the selected variance value.

Figure 17:
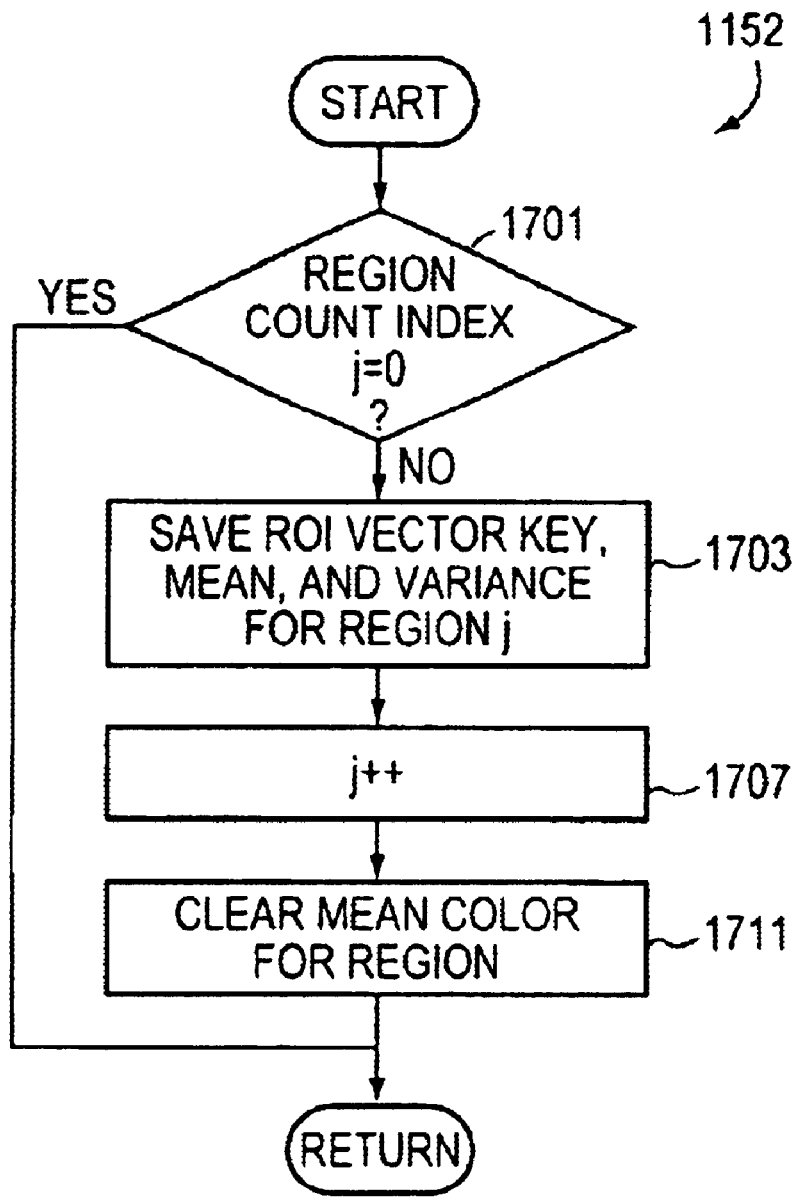
FIG. 17 is a flow diagram of an add region computer-implemented process.

FIG. 17 illustrates the Add Region routine 1152 that is executed in response to actuation of the Add Region button 434 (FIG. 9). Starting at step 1701, the first step taken is to inquire whether a region count index j=0. The index j is employed to keep track of the number of simultaneous regions that are being employed in the current scene. For example, FIG. 3 illustrates employment of two vectorized key windows with corresponding mattes. If the region count index is not at 0, control passes to step 1703. The region of interest vector, the mean, and the variance for the present region j is then saved in a memory location of the system. Control passes to step 1707, and the region count index j is incremented. At step 1711, the mean color for the region is cleared so as to allow the operator to establish a new mean color for identifying the region of interest. The routine then exits.

Figure 18:
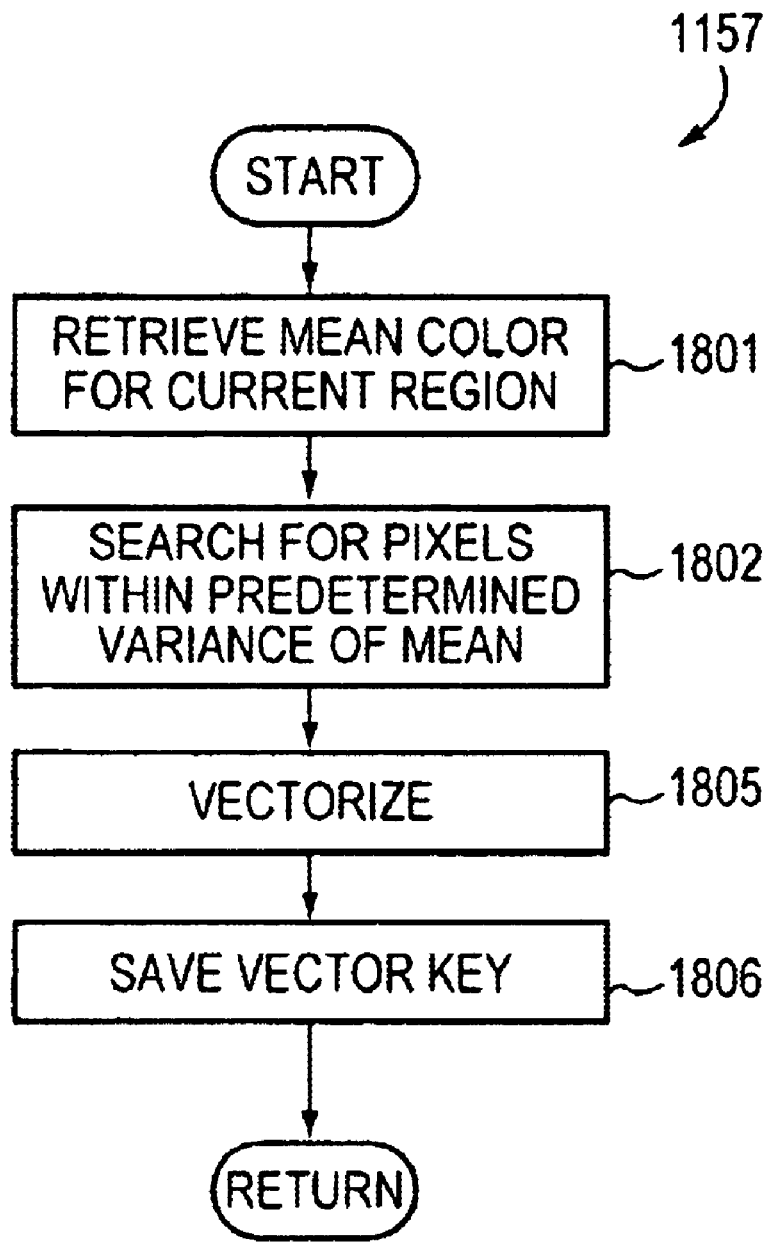
FIG. 18 is a flow diagram of a detect computer-implemented process.

FIG. 18 illustrates the Detect routine 1157 that is executed in response to the operator's actuation of the Detect button 425 (FIG. 9). The first step taken at 1801 is to retrieve the mean color for the current region j. At step 1802 the system searches for pixels in the image that have color values within the predetermined variance of the mean. At step 1806, the identified pixels are employed as the basis for vectorizing operation to establish a vector key for the region of interest. At step 1808, the vector key is saved.

From the foregoing, it will be understood and appreciated that the present invention allows an operator to identify a region of interest by hue, saturation, and/or luminance, and particularly RGB color information so as to identify a color region of interest, automatically establish a vector key for the region of interest that can be selectably adjusted so as create a region for applying image processing such as color correction and autotrack this region of interest based on the mean color of the region of interest over a number of frames in a scene.

In view of the foregoing description of the preferred embodiments of the present invention, other embodiments will suggest themselves to those skilled in the art. Therefore, the scope of the present invention is to be limited only by the claims set forth below.

What is claimed is:

1. A computer-implemented process for defining a selected region of an image, comprising the steps of:
   in response to user commands, selecting one or more picture elements on a displayed representation of the image;
   determining a calculated parameter based on the selected one or more picture elements;
   defining a key comprising a selected plurality of picture elements having parameter values that fall within a predetermined range of the calculated parameter, the key corresponding to the selected region for applying image processing to the target image; and
   vectorizing the key to derive a user defined window defining the selected region of the image.

2. The process of claim 1, wherein the calculated parameter comprises the mean of the color value of the selected one or more picture elements.

3. The process of claim 2, wherein the type of calculated parameter is selected from the group comprising hue, saturation, luminance, and RGB.

4. The process of claim 2, wherein the color value of the selected one or more picture elements comprises the red (R), green (G), and blue (B) color values in an RGB color representation.

5. The process of claim 1, wherein the predetermined range of the calculated parameter comprises a user selectable variance.

6. The process of claim 1, wherein the step of vectorizing comprises drawing a continuous polygon drawn around the selected region of interest in the key, the continuous polygon comprising a predetermined number of points specified by the user.

7. The process of claim 1, further comprising the step of:
   in response to user commands, editing characteristics of the user defined window to allow the user to adapt the window to the key.

8. The process of claim 1, further comprising the step of applying image processing to the selected region of the image.

9. The process of claim 8, wherein the image processing is selected from the group color correction, image compression, noise reduction, colorization, and animation.

10. The process of claim 8, further comprising the step of applying a softness filter to boundaries of the user defined window so as to apply image processing on a predetermined gradient.

11. The process of claim 8, further comprising the step of defining a plurality of user defined windows corresponding to a plurality of regions in the image.

12. The process of claim 11, further comprising the step of applying a different type of image processing to regions of the image outside the user defined window.

13. The process of claim 12, wherein the step of applying image processing within the region of the image defined by the user defined window comprises applying a first set of color corrections in a scene-by-scene color corrector; and
   wherein the step of applying image processing to regions of the image outside the user defined window comprises applying a second set of color corrections.

14. A system for defining a selected region of an image, comprising:
   a user interface for allowing operator selection of one or more picture elements on a displayed representation of the image;
   a component for determining a calculated parameter based on the selected one or more picture elements;
   a component for defining a key comprising a selected plurality of picture elements having parameter values that fall within a predetermined range of the calculated parameter, the key corresponding to the selected region for applying image processing to the target image; and
   a vectorizing component operative upon the key for generating a continuous closed polygon ("user defined window") defining the selected region of the image.

15. The system of claim 14, wherein the calculated parameter comprises the mean of the color value of the selected one or more picture elements.

16. The system of claim 15, wherein the calculated parameter is selected from the group comprising hue, saturation, luminance, and RGB.

17. The system of claim 15, wherein the color value of the selected one or more picture elements comprises the red (R), green (G), and blue (B) color values in an RGB color representation.

18. The system of claim 14, wherein the predetermined range of the calculated parameter comprises a user selectable variance.

19. The system of claim 14, wherein the vectorizing component is operative for drawing a continuous polygon drawn around the selected region in the key, the continuous polygon comprising a predetermined number of points specified by the user.

20. The system of claim 14, further comprising:
    user tools operative to allow the user to edit characteristics of the user defined window to allow the user to adapt the window to the key.

21. The system of claim 14, further comprising a component for applying image processing to the selected region of the image.

22. The system of claim 21, wherein the image processing is selected from the group color correction, image compression, noise reduction, colorization, and animation.

23. The system of claim 21, further comprising a softness filter operative near boundaries of the user defined window for applying image processing on a predetermined gradient.

24. The system of claim 21, wherein the system is operative for defining a plurality of user defined windows corresponding to a plurality of regions in the image.

25. The system of claim 24, wherein the system is operative for applying a different type of image processing to regions of the image outside the user defined window.

26. The system of claim 21, wherein the system is employed in a scene-by-scene color corrector; and
    wherein the image processing component is operative for applying image processing within the region of the image defined by the user defined window with a first set of color corrections; and
    wherein the image processing component is operative for applying image processing to regions of the image outside the user defined window with a second set of color corrections.

27. A computer-implemented process for selectively applying image processing to a selected region of a target image provided by an image source, the process being carried out in a computer system coupled to the image source, comprising the steps of:
    in response to user commands, selecting one or more picture elements on a displayed representation of the target image;
    determining a calculated parameter based on the selected one or more picture elements;
    defining a key comprising a selected plurality of picture elements having parameter values that fall within a predetermined range of the calculated parameter, the key corresponding to the selected region for applying image processing to the target image;
    vectorizing the key to derive a user defined window; and
    applying image processing within the region of the target image corresponding to the user defined window.

28. The process of claim 27, wherein the calculated parameter comprises the mean of the color value of the selected one or more picture elements.

29. The process of claim 28, wherein the type of calculated parameter is selected from the group comprising hue, saturation, luminance, and RGB.

30. The process of claim 28, wherein the color value of the selected one or more picture elements comprises the red (R), green (G), and blue (B) color values in an RGB color representation.

31. The process of claim 27, wherein the predetermined range of the calculated parameter comprises a user selectable variance.

32. The process of claim 27, wherein the image processing is selected from the group color correction, image compression, noise reduction, colorization, and animation.

33. The process of claim 27, wherein the step of vectorizing comprises drawing a continuous polygon drawn around the selected region in the key, the continuous polygon comprising a predetermined number of points specified by the user.

34. The process of claim 27, further comprising the step of:
    in response to user commands, editing characteristics of the user defined window to allow the user to adapt the window to the key.

35. The process of claim 27, further comprising the steps of:
    in response to user commands, identifying a selected plurality of images as target images, the plurality of images comprising a first image and at least a second image;
    utilizing the user defined window from the first image as a starting window, defining a key for the second image, the key comprising a selected plurality of picture elements in the second image having parameter values that fall within the predetermined range of the calculated parameter;
    vectorizing the key of the second image to derive a user defined window for the second image; and
    applying image processing within the region of the target images corresponding to the user defined windows for each image in the plurality of images.

36. The process of claim 35, wherein the step of utilizing the user defined window from the first image comprises:
    determining a seed point in the first user defined window;
    utilizing the seed point, searching within the second image for picture elements having parameter values that fall within the predetermined range of the calculated parameter;
    utilizing the picture elements found in the searching step to define a key for the second image.

37. The process of claim 27, further comprising the step of applying a softness filter to boundaries of the user defined window so as to apply image processing on a predetermined gradient.

38. The process of claim 27, further comprising the step of defining a plurality of user defined windows corresponding to a plurality of regions for applying image processing.

39. The process of claim 27, further comprising the step of applying a different type of image processing to regions of the image outside the user defined window.

40. The process of claim 39, wherein the step of applying image processing within the region of the image defined by the user defined window comprises applying a first set of color corrections in a scene-by-scene color corrector; and
    wherein the step of applying image processing to regions of the image outside the user defined window comprises applying a second set of color corrections.

41. A system for selectively applying image processing to a selected region of a target image provided by an image source, comprising:
    a user interface for allowing operator selection of one or more picture elements on a displayed representation of the target image;
    a component for determining a calculated parameter based on the selected one or more picture elements;
    a component for defining a key comprising a selected plurality of picture elements having parameter values that fall within a predetermined range of the calculated parameter, the key corresponding to the selected region for applying image processing to the target image;
    a vectorizing component for vectorizing the key to derive a user defined window; and
    a component for applying image processing within the region of the target image corresponding to the user defined window.

42. The system of claim 40, wherein the calculated parameter comprises the mean of the color value of the selected one or more picture elements.

43. The process of claim 41, wherein the type of calculated parameter is selected from the group comprising hue, saturation, luminance, and RGB.

44. The system of claim 41, wherein the color value of the selected one or more picture elements comprises the red (R), green (G), and blue (B) color values in an RGB color representation.

45. The system of claim 40, wherein the predetermined range of the calculated parameter comprises a user selectable variance.

46. The system of claim 40, wherein the image processing is selected from the group color correction, image compression, noise reduction, colorization, and animation.

47. The system of claim 40, wherein the component for vectorizing is operative for drawing a continuous polygon drawn around the selected region in the key, the continuous polygon comprising a predetermined number of points specified by the user.

48. The system of claim 40, further comprising a component responsive to user commands for editing characteristics of the user defined window to allow the user to adapt the window to the key.

49. The system of claim 40, further comprising:
   user controls that allow identification of a selected plurality of images as target images, the plurality of images comprising a first image and at least a second image; and
   a component operative for utilizing the user defined window from the first image as a starting window and defining a key for the second image, the key comprising a selected plurality of picture elements in the second image having parameter values that fall within the predetermined range of the calculated parameter; and
   wherein the vectorizing component is operative for vectorizing the key of the second image to derive a user defined window for the second image; and the image processing component is operative for applying image processing within the region of the target images corresponding to the user defined windows for each image in the plurality of images.

50. The system of claim 49, wherein the component for utilizing the user defined window from the first image comprises:
   a component for determining a seed point in the first user defined window;
   a component for searching within the second image, starting with the seed point, for picture elements having parameter values that fall within the predetermined range of the calculated parameter; and
   wherein the utilizing the picture elements found in the searching step to define a key for the second image.

51. The system of claim 40, further comprising a softness filter operative near the boundaries of the user defined window for applying image processing on a predetermined gradient.

52. The system of claim 40, wherein the system is operative for defining a plurality of user defined windows corresponding to a plurality of regions for applying image processing.

53. The system of claim 40, wherein the system is operative for applying a different type of image processing to regions of the image outside the user defined window.

54. The system of claim 52, wherein the system is employed in a scene-by-scene color corrector; and
   wherein the image processing component is operative for applying image processing within the region of the image defined by the user defined window with a first set of color corrections; and
   wherein the image processing component is operative for applying image processing to regions of the image outside the user defined window with a second set of color corrections.

55. A process for applying color correction to a selected region in a frame in a scene, for use in a scene by scene color corrector (30), characterized by:
   (a) in response to user commands (18, 19, 20), with respect to a frame in the scene, determining a selected color parameter (415) from a selected point or points (153) in a region of interest (156);
   (b) in response to the selected color parameter, defining a selected region (150) in the frame, the selected region comprising picture elements qualified in relation to the selected color parameter;
   (c) generating a user defined window (160) for the frame corresponding to the selected region (150); and
   (d) applying color correction (122) to areas within the user defined window (160) in a frame in the scene.

56. The process of claim 55, wherein the user defined window (160) comprises a continuous polygon circumscribing the selected region (150).

57. The process of claim 55, wherein the frame in the scene is a selected frame in a plurality of frames in the scene, and wherein the steps of defining a selected region in response to the selected color parameter, generating a user defined window, and applying color correction are carried out with respect to all frames in the plurality of frames.

58. The process of claim 55, wherein the step of generating a user defined window (160) comprises the steps of:
   conducting a search algorithm to isolate the x and y coordinates of picture elements that qualify for inclusion within the selected region, and
   vectorizing the x and y coordinates to generate the user defined window.

59. The process of claim 58, wherein the search algorithm comprises the steps of:
   determining a seed point (172) in the frame;
   starting at a point associated with the seed point, searching in the frame according to a predetermined methodology for picture elements that fall within a predetermined range of the color parameter;
   defining the x and y coordinates of a point in the frame at which the values of the picture element fall outside of a predetermined range of the selected color parameter.

60. The process of claim 59, wherein the predetermined range of the selected color parameter comprises a user selectable variance.

61. The process of claim 55, wherein the color parameter comprises the mean of the color values of a selected one or more picture elements.

62. The process of claim 61, wherein the color parameter is selected from the group comprising hue, saturation, luminance, and RGB.

63. The process of claim 62, wherein the color value of the selected one or more picture elements comprises the red (R), green (G), and blue (B) color values in an RGB color representation.

64. The process of claim 64, further characterized by the following steps:
   (e) defining a selected region (150) in a first frame of a scene, the selected region comprising picture elements qualified in relation to the selected color parameter (415);

(f) generating a user defined window (160) corresponding to the selected region for the first frame;

(g) for a subsequent frame in the scene, defining a selected region (150') in the subsequent frame, the selected region comprising picture elements qualified in relation to the selected color parameter (415);

(h) generating a user defined window (160') corresponding to the selected region for the subsequent frame; and (i) applying color correction (122) to areas within the user defined windows (160, 160') in the first frame and the subsequent frames.

65. A system for applying color correction to a selected region in a frame in a scene, for use in a scene by scene color corrector (30) including a color correction component (80) and a component (75) for generating a user defined window in which color corrections are applied by the color correction component (80), characterized by:

a component for determining a selected color parameter (415) from a selected point or points (153) in a region of interest (156) in a frame of a scene in response to user commands (18, 19, 20);

a component (78) operative to define a selected region (150) in a frame of the scene in response to the selected color parameter; and the component (75) being operative for generating a user defined window (160) for the frame corresponding to the selected region (150).

66. The system of claim 65, wherein the user defined window component (75) is further operative for generating a user defined window (160') for a subsequent frame of the scene corresponding to a selected region (150') in the subsequent frame in response to the selected color parameter, within which the color correction component (80) applies color correction in the subsequent frame.

67. The system of claim 65, wherein the user defined window (160) comprises a continuous polygon circumscribing the selected region (150).

68. The system of claim 65, wherein the component (78) operative to define a selected region (150) is further operative for utilizing a region from a particular frame to define a region in a subsequent frame.

69. The system of claim 65, wherein the component (78) operative to define a selected region (150) is further operative for conducting a search algorithm to isolate the x and y coordinates of picture elements that qualify for inclusion within the selected region.

70. The system of claim 69, wherein the search algorithm starts at a seed point (172) within the frame and searches from the seed point according to a predetermined methodology for picture elements that fall within a predetermined range of the color parameter (415).

71. The system of claim 70, wherein the seed point (172) is determined from a user defined window (160) of a previous frame.

72. The system of claim 65, wherein the component (75) is operative to define the user defined window (160) from the x and y coordinates of picture elements that qualify for inclusion within the selected region (150).

73. The system of claim 70, wherein the predetermined range of the color parameter (415) comprises a user selectable variance.

74. The system of claim 73, wherein the color parameter comprises the mean of the color values of a selected one or more picture elements in the frame.

75. The system of claim 65, wherein the color parameter (415) is selected from the group comprising hue, saturation, luminance, and RGB.

76. The system of claim 75, wherein the color values of the selected one or more picture elements comprises the red (R), green (G), and blue (B) color values in an RGB color representation.

77. The system of claim 65, wherein the component (78) operative to define a selected region (150) in a frame of a scene is operative for:
defining a selected region (150) in a first frame of a scene, the selected region comprising picture elements qualified in relation to the selected color parameter (415); and
for a subsequent frame in the scene, defining a selected region (150') in the subsequent frame, the selected region comprising picture elements also qualified in relation to the selected color parameter (415);

and wherein the component (75) for generating a user defined window is operative for:
generating a user defined window (160) corresponding to the selected region for the first frame, and
generating a user defined window (160') corresponding to the selected region for the subsequent frame;

and wherein color correction component (80) is operative for applying color correction (122) to areas within the user defined windows (160, 160') in the first frame and the subsequent frame.

\* \* \* \* \*